United States Patent
Gobin et al.

(10) Patent No.: US 12,458,782 B2
(45) Date of Patent: Nov. 4, 2025

(54) CEREBROSPINAL FLUID SHUNT

(71) Applicants: Azygos Vascular, Inc., Deephaven, MN (US); Center for Technology Licensing Cornell University, Ithaca, NY (US)

(72) Inventors: Yves Pierre Gobin, Harrison, NY (US); Jeffrey P. Callister, Deephaven, MN (US); Ryan Bauer, Plymouth, MN (US)

(73) Assignees: Azygos Vascular, Inc., Deephaven, MN (US); Center for Technology Licensing Cornell University, Ithaca, NY (US)

( * ) Notice: Subject to any disclaimer, the term of this patent is extended or adjusted under 35 U.S.C. 154(b) by 46 days.

(21) Appl. No.: 18/443,455

(22) Filed: Feb. 16, 2024

(65) Prior Publication Data
US 2024/0277985 A1    Aug. 22, 2024

Related U.S. Application Data

(60) Provisional application No. 63/446,064, filed on Feb. 16, 2023.

(51) Int. Cl.
*A61M 27/00* (2006.01)

(52) U.S. Cl.
CPC ... *A61M 27/006* (2013.01); *A61M 2205/0216* (2013.01); *A61M 2205/0266* (2013.01);
(Continued)

(58) Field of Classification Search
CPC .............. A61M 27/002; A61M 27/006; A61M 2205/0216; A61M 2205/0266;
(Continued)

(56) References Cited

U.S. PATENT DOCUMENTS

| 6,905,474 B2 | 6/2005 | Borgesen |
|---|---|---|
| 7,513,883 B2 | 4/2009 | Glenn |

(Continued)

FOREIGN PATENT DOCUMENTS

WO    2023250086 A1    12/2023

OTHER PUBLICATIONS

Patent Cooperatio Treaty, "International Search Report and Written Opinion," issued in connection with International Patent Application No. PCT/US2024/16096, mailed Jul. 18, 2024, 15 pages.

*Primary Examiner* — Philip R Wiest
(74) *Attorney, Agent, or Firm* — MCANDREWS, HELD & MALLOY, LTD.

(57) ABSTRACT

A method including: introducing a shunt into a vascular system, wherein the shunt includes an inlet aperture in an inlet region and an outlet aperture in an outlet region; positioning the inlet region into an epidural or intervertebral vein; with a stylet, puncturing a wall of the epidural or intervertebral vein, traversing an interstitial space, and puncturing a thecal sac, wherein the stylet includes a wire extending through the shunt; moving the shunt to cause the inlet region to extend through a wall of the epidural or intervertebral vein; moving the shunt to cause the inlet region to extend into an interstitial space; and moving the shunt to cause the inlet region to extend through the thecal sac, such that the inlet region is positioned in an intradural space, and such that the outlet region is positioned in a venous pathway.

34 Claims, 16 Drawing Sheets

(52) U.S. Cl.
CPC ..... *A61M 2205/04* (2013.01); *A61M 2205/32* (2013.01); *A61M 2205/3334* (2013.01); *A61M 2209/00* (2013.01); *A61M 2210/083* (2013.01); *A61M 2210/086* (2013.01); *A61M 2210/1003* (2013.01); *A61M 2210/12* (2013.01)

(58) Field of Classification Search
CPC .......... A61M 2205/04; A61M 2205/32; A61M 2205/3334; A61M 2209/00; A61M 2210/083; A61M 2210/086; A61M 2210/1003; A61M 2210/12
See application file for complete search history.

(56) References Cited

U.S. PATENT DOCUMENTS

| | | |
|---|---|---|
| 7,998,103 B2 | 8/2011 | El Shafei et al. |
| 8,672,871 B2 | 3/2014 | Heilman et al. |
| 9,199,067 B2 | 12/2015 | Heilman et al. |
| 9,387,311 B1 * | 7/2016 | Heilman ............... A61M 25/10 |
| 9,545,468 B2 | 1/2017 | Aboul-Hosn et al. |
| 9,545,505 B2 | 1/2017 | Heilman et al. |
| 9,662,479 B2 | 5/2017 | Heilman et al. |
| 9,669,195 B2 | 6/2017 | Heilman et al. |
| 9,724,501 B2 | 8/2017 | Heilman et al. |
| 9,737,697 B2 | 8/2017 | Heilman et al. |
| 10,058,686 B2 | 8/2018 | Heilman et al. |
| 10,112,036 B2 | 10/2018 | Heilman et al. |
| 10,272,230 B2 | 4/2019 | Malek et al. |
| 10,279,154 B2 | 5/2019 | Heilman et al. |
| 10,307,576 B2 | 6/2019 | Heilman et al. |
| 10,307,577 B2 | 6/2019 | Malek et al. |
| 10,596,357 B2 | 3/2020 | Heilman et al. |
| 10,758,718 B2 | 9/2020 | Malek et al. |
| 10,765,846 B2 | 9/2020 | Heilman et al. |
| 11,013,900 B2 | 5/2021 | Malek et al. |
| 11,278,708 B2 | 3/2022 | Heilman et al. |
| 2007/0112291 A1 | 5/2007 | Borgesen |
| 2007/0112293 A1 | 5/2007 | Borgesen |
| 2008/0249458 A1 | 10/2008 | Yamasaki |
| 2008/0262406 A1 | 10/2008 | Wiener |
| 2010/0191168 A1 | 7/2010 | Heilman |
| 2012/0296256 A1 | 11/2012 | Heilman et al. |
| 2014/0276347 A1 * | 9/2014 | Stone ................... A61M 27/002 604/9 |
| 2014/0336559 A1 | 11/2014 | Heilman et al. |
| 2015/0196741 A1 | 7/2015 | Heilman et al. |
| 2016/0082231 A1 | 3/2016 | Heilman et al. |
| 2016/0136398 A1 * | 5/2016 | Heilman ............ A61M 25/0108 604/9 |
| 2016/0199627 A1 | 7/2016 | Heilman et al. |
| 2016/0303355 A1 | 10/2016 | Heilman et al. |
| 2016/0303356 A1 | 10/2016 | Heilman et al. |
| 2017/0021146 A1 | 1/2017 | Heilman et al. |
| 2017/0028177 A1 | 2/2017 | Heilman et al. |
| 2017/0157375 A1 | 6/2017 | Heilman et al. |
| 2017/0209676 A1 | 7/2017 | Heilman et al. |
| 2018/0015267 A1 | 1/2018 | Heilman et al. |
| 2018/0126132 A1 | 5/2018 | Heilman et al. |
| 2018/0207412 A1 | 7/2018 | Malek et al. |
| 2018/0256866 A1 | 9/2018 | Malek et al. |
| 2018/0264240 A1 | 9/2018 | Heilman et al. |
| 2019/0105477 A1 | 4/2019 | Heilman et al. |
| 2019/0105478 A1 | 4/2019 | Malek et al. |
| 2019/0117945 A1 | 4/2019 | Borgesen |
| 2019/0192834 A1 | 6/2019 | Borgesen |
| 2019/0298977 A1 | 10/2019 | Heilman et al. |
| 2020/0030588 A1 | 1/2020 | Heilman et al. |
| 2020/0069927 A1 | 3/2020 | Malek et al. |
| 2020/0085600 A1 | 3/2020 | Schwartz et al. |
| 2020/0282200 A1 * | 9/2020 | Hakim ................ F16K 37/0033 |
| 2020/0368506 A1 | 11/2020 | Malek et al. |
| 2020/0375766 A1 | 12/2020 | Malek |
| 2020/0376239 A1 | 12/2020 | Heilman et al. |
| 2020/0406018 A1 | 12/2020 | Malek et al. |
| 2021/0228846 A1 | 7/2021 | Sattell et al. |
| 2021/0268252 A1 | 9/2021 | Malek et al. |
| 2021/0322736 A1 | 10/2021 | Borgesen |
| 2022/0096744 A1 * | 3/2022 | Riccardi ............ A61M 5/16886 |
| 2022/0176090 A1 | 6/2022 | Fell et al. |
| 2022/0249284 A1 | 8/2022 | Azar et al. |
| 2022/0288363 A1 | 9/2022 | Heilman et al. |
| 2022/0355015 A1 * | 11/2022 | Patel ..................... A61M 1/16 |
| 2023/0364395 A1 * | 11/2023 | Meyer ................ A61M 27/006 |
| 2024/0115842 A1 * | 4/2024 | Malek ................ A61M 27/006 |
| 2024/0416093 A1 * | 12/2024 | Kitaoka ............. A61M 27/006 |

* cited by examiner

CEREBROSPINAL FLUID SHUNT

CROSS REFERENCE TO RELATED APPLICATIONS

This application claims the benefit of U.S. Prov. 63/446,064, filed on Feb. 16, 2023, the entirety of which is incorporated by reference, herein.

BACKGROUND

Generally, this application relates to shunts for cerebrospinal fluid (CSF).

Figure 1:
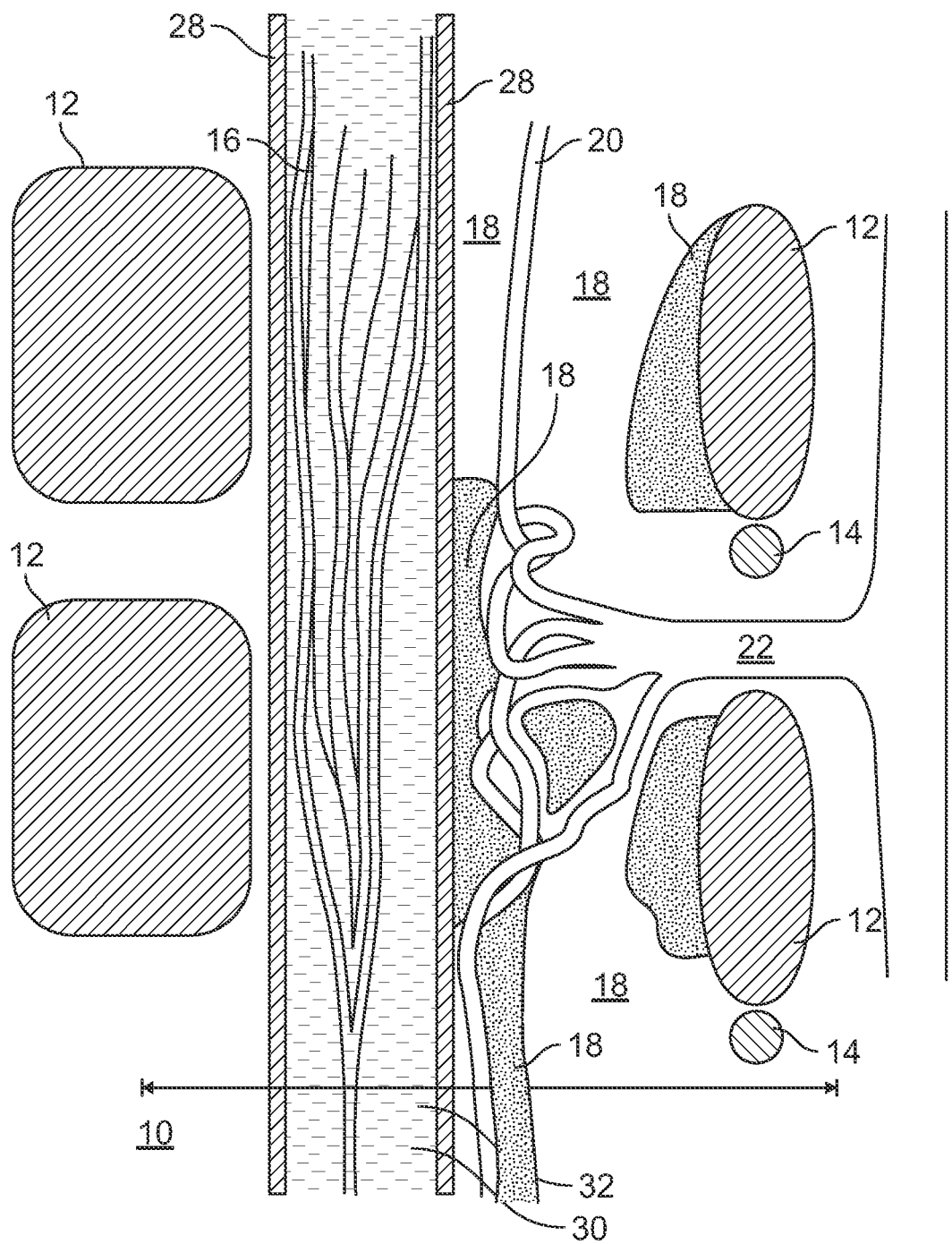
FIG. 1 illustrates a cross-sectional view of a patient's anatomy.

The foregoing summary, as well as the following detailed description of certain techniques of the present application, will be better understood when read in conjunction with the appended drawings. For the purposes of illustration, certain techniques are shown in the drawings. It should be understood, however, that the claims are not limited to the arrangements and instrumentality shown in the attached drawings. Furthermore, the appearance shown in the drawings is one of many ornamental appearances that can be employed to achieve the stated functions of the system.

SUMMARY

According to embodiments, a method for endovenously positioning a cerebrospinal fluid shunt in a patient includes: introducing the cerebrospinal fluid shunt into a vascular system of the patient, wherein the cerebrospinal fluid shunt includes an inlet aperture in an inlet region and an outlet aperture in an outlet region, wherein the inlet aperture and the outlet aperture are in fluid communication with each other; positioning the inlet region of the cerebrospinal fluid shunt into an epidural vein or an intervertebral vein; with a stylet, puncturing a wall of the epidural vein or the intervertebral vein, traversing an interstitial space, and puncturing a thecal sac, wherein the stylet includes a wire extending through the cerebrospinal fluid shunt; moving the cerebrospinal fluid shunt to cause the inlet region to extend through a wall of the epidural vein or the intervertebral vein; subsequent to moving the cerebrospinal fluid shunt to cause the inlet region to extend through a wall of the epidural vein or the intervertebral vein, moving the cerebrospinal fluid shunt to cause the inlet region to extend into an interstitial space; and subsequent to moving the cerebrospinal fluid shunt to cause the inlet region to extend into the interstitial space, moving the cerebrospinal fluid shunt to cause the inlet region to extend through the thecal sac, such that the inlet region of the cerebrospinal fluid shunt is positioned in an intradural space, and such that the outlet region of the cerebrospinal fluid shunt is positioned in a venous pathway. The epidural vein or the intervertebral vein may be located in a lumbar region of the patient. The epidural vein or the intervertebral vein may be located in a thoracic region of the patient. The epidural vein or the intervertebral vein may be located in a cervical region of the patient. The epidural vein or the intervertebral vein may be located in a sacrum of the patient. The venous pathway where the outlet aperture of the cerebrospinal fluid shunt may be located includes at least one of an epidural vein, an intervertebral vein, a paraspinal vein, a lumbar vein, an iliac vein, a femoral vein, an azygos vein, a hemiazygos vein, an inferior vena cava, a superior vena cava, a right atrium of a heart, or a vein tributary of the inferior vena cava or superior vena cava. The method may further include, subsequent to puncturing the thecal sac, deploying an anchor within the intradural space to stabilize the inlet region of the cerebrospinal fluid shunt with respect to the thecal sac. The method may further include, prior to puncturing the thecal sac, deploying a limiter at least partially in the interstitial space, wherein the limiter determines a maximum length of the cerebrospinal fluid shunt that extends through the thecal sac and into the intradural space. The step of deploying a limiter may include expanding the limiter such that an outer radius of the limiter may be greater than an outer radius of a transverse region of the cerebrospinal fluid shunt between the inlet region and the outlet region. The outlet region of the cerebrospinal fluid shunt may be located in one of an epidural vein, an intervertebral vein, a lumbar vein, an iliac vein, or a perivertebral vein when the inlet region of the cerebrospinal fluid shunt may be located in the intradural space. The cerebrospinal fluid shunt may include silicone. The cerebrospinal fluid shunt may include polyurethane. The cerebrospinal fluid shunt may include nitinol. The cerebrospinal fluid shunt may include at least one radiopaque marker. The cerebrospinal fluid shunt may include a material on at least one of an exterior of the cerebrospinal fluid shunt or an interior of the inlet region configured to reduce at least one of coagulation of blood, aggregation of proteins, or aggregation of cells. The cerebrospinal fluid shunt may include an anti-reflux mechanism between the inlet aperture and the outlet aperture, wherein the anti-reflux mechanism may be configured to reduce or prevent retrograde migration of blood. The cerebrospinal fluid shunt may include a flow regulator between the inlet aperture and the outlet aperture, wherein the flow regulator may be configured to regulate a flow of cerebrospinal fluid between the inlet aperture and the outlet aperture. The step of introducing the cerebrospinal fluid shunt into the vascular system of the patient may include introducing the cerebrospinal fluid shunt into a vein of a leg, a vein of a neck, or a vein of an arm. The method may further include the step of removing the cerebrospinal fluid shunt by engaging with a shunt removal feature on the cerebrospinal fluid shunt. The method may further include the step of temporarily enlarging at at least one enlargement location, at least one of the aperture through one of the epidural vein wall or the intervertebral vein wall, a region of interstitial space, or the aperture through the thecal sac by positioning a balloon at the at least one enlargement location and then inflating the balloon to perform enlarging before or during passage of the shunt through the at least one enlargement location.

According to embodiments a cerebrospinal fluid shunt for placement in a patient includes: an inlet region configured to pass through an aperture in an epidural vein wall or an intervertebral vein wall, to pass through an aperture in a thecal sac, and to pass through an interstitial space between one of the epidural vein wall or the intervertebral vein wall and the thecal sac; an inlet aperture in the inlet region, wherein the inlet aperture is configured to receive cerebrospinal fluid from an intradural space; an outlet region configured to be positioned in a venous pathway; an outlet aperture in the outlet region, wherein the outlet aperture is in fluid communication with the inlet aperture, wherein the outlet aperture is configured to permit flow the cerebrospinal fluid received by the inlet region out of the cerebrospinal fluid shunt; a transverse region between the inlet region and the outlet region, wherein the transverse region comprises a channel to enable fluid communication between the inlet aperture and the outlet aperture; and an insertion-limiting portion located in the transverse region, wherein the insertion-limiting portion configured to be positioned in the interstitial space between the epidural vein wall or the intervertebral vein wall and the thecal sac. The shunt may further include: at least one radio opaque marker at least partially located in the inlet region; at least one radio opaque marker located at least partially in the transverse region; and at least one radio opaque marker located at least partially in the outlet region. The inlet region may include a bulbous head region. The insertion-limiting portion may include a radially-protruding portion, and wherein the bulbous head region and the radially-protruding portion may be integrated in one piece. The one piece may be coupled to another portion of the cerebrospinal fluid shunt including the outlet region.

According to embodiments, a system for positioning a cerebrospinal fluid shunt in a patient includes: a guide catheter configured to slide over a proximal region of a guidewire positioned in a venous system of the patient, wherein the guide catheter comprises a proximal region and a distal region, wherein the guide catheter comprises an anchor configured to anchor the distal region of the guide catheter at a location in the venous system of the patient; an adapter coupled with the proximal region of the guide catheter, wherein the adapter is configured to selectively prevent fluids from flowing from the patient and out of the adapter; a sheath including a proximal region and a distal region, wherein the sheath is at least partially positioned within the guide catheter; a shunt at least partially positioned between the guide catheter and the sheath, wherein the shunt comprises an inlet region including an inlet aperture, an outlet region including an outlet aperture, and a transverse region between the inlet region and the outlet region, wherein the transverse region comprises a channel such that the inlet aperture is in fluid communication with the outlet aperture, wherein the transverse region is configured to extend through a vein wall and through an interstitial space, wherein the inlet region is configured to extend through a thecal sac and into an intradural space, and wherein the outlet region is configured to be positioned in a venous pathway; and a wire configured to extend through the shunt and at least partially out of the inlet aperture, wherein the wire comprises a proximal region and a distal region, and wherein the distal region is configured to puncture the vein wall and the thecal sac. The anchor of the guide catheter may include a balloon. The inlet region of the shunt further may include an anchor configured to stabilize the inlet region with respect to the thecal sac. The sheath may include a retractable sheath. The transverse region may include a limiter configured to limit a distance of insertion of the shunt into the patient.

According to embodiments, a method for endovenously positioning a cerebrospinal fluid shunt in a patient includes: introducing the cerebrospinal fluid shunt into a vascular system of the patient, wherein the cerebrospinal fluid shunt includes an inlet aperture in an inlet region and an outlet aperture in an outlet region, wherein the inlet aperture and the outlet aperture are in fluid communication with each other; positioning the inlet region of the cerebrospinal fluid shunt into an epidural vein or an intervertebral vein; subsequent to positioning the inlet region of the cerebrospinal fluid shunt the epidural vein or the intervertebral vein, moving the cerebrospinal fluid shunt to cause the inlet region to extend into an interstitial space; and subsequent to moving the cerebrospinal fluid shunt to cause the inlet region to extend into an interstitial space, moving the cerebrospinal fluid shunt to cause the inlet region to pass through an aperture thecal sac, such that the inlet region of the cerebrospinal fluid shunt is positioned at least partially in an intradural space, and such that the outlet region of the cerebrospinal fluid shunt is positioned in a venous pathway.

According to embodiments, method for endovenously positioning a cerebrospinal fluid shunt in a patient includes: introducing the cerebrospinal fluid shunt into a vascular system of the patient, wherein the cerebrospinal fluid shunt includes an inlet aperture in an inlet region and an outlet aperture in an outlet region, wherein the inlet aperture and the outlet aperture are in fluid communication with each other; positioning the inlet region of the cerebrospinal fluid shunt into an epidural vein or an intervertebral vein; moving the cerebrospinal fluid shunt to cause the inlet region to pass through an aperture in a wall of the epidural vein or the intervertebral vein; and subsequent to moving the cerebrospinal fluid shunt to cause the inlet region to pass through a wall of the epidural vein or the intervertebral vein, moving the cerebrospinal fluid shunt to cause the inlet region to pass through an aperture in a thecal sac, such that the inlet region of the cerebrospinal fluid shunt is positioned at least partially within an intradural space, and such that the outlet region of the cerebrospinal fluid shunt is positioned in a venous pathway.

According to embodiments, a method for endovenously positioning a cerebrospinal fluid shunt in a patient includes: introducing the cerebrospinal fluid shunt into a vascular system of the patient, wherein the cerebrospinal fluid shunt includes an inlet aperture in an inlet region and an outlet aperture in an outlet region, wherein the inlet aperture and the outlet aperture are in fluid communication with each other; positioning the inlet region of the cerebrospinal fluid shunt into an epidural vein or an intervertebral vein; moving the cerebrospinal fluid shunt to cause the inlet region to extend through a wall of the epidural vein or the intervertebral vein; subsequent to moving the cerebrospinal fluid shunt to cause the inlet region to extend through a wall of the epidural vein or the intervertebral vein, moving the cerebrospinal fluid shunt to cause the inlet region to extend into an interstitial space; and subsequent to moving the cerebrospinal fluid shunt to cause the inlet region to extend into the interstitial space, moving the cerebrospinal fluid shunt to cause the inlet region to extend through a thecal sac, such that the inlet region of the cerebrospinal fluid shunt is positioned in an intradural space, and such that the outlet region of the cerebrospinal fluid shunt is in fluid communication with at least one of a reservoir positioned at under a skin of the patient or a transdermal port. The transdermal port may be configured to at least one of permit delivery of a drug to the patient, drain CSF, or facilitate measurement of CSF pressure.

DETAILED DESCRIPTION

Embodiments herein relate to systems and methods for draining excess cerebrospinal fluid (CSF) from a patient's intradural space, and particularly the subarachnoid space in the spinal canal. Embodiments herein describe positioning a CSF shunt in the patient using an endovenous approach with veins in a spinal area.

Cerebrospinal fluid is an ultrafiltrate of blood plasma. It is a substantially clear liquid with a density close to that of water. The CSF bathes the brain inside the skull as well as the spine and spinal nerve roots inside the spinal canal. The CSF is enclosed within the dura mater or dura, which is a thick and relatively inelastic membrane covering the inner surface of the skull and spinal canal. In the spinal area the dura is called the thecal sac. The CSF is secreted inside the brain ventricles by the choroid plexus, and it circulates around the folds of the brain and around the spinal cord and nerve roots. The CSF is reabsorbed into the venous blood by the arachnoid granulations. Some arachnoid granulations are located around the brain along the walls of the venous sinuses, in which case the CSF transits into the venous sinuses. Other arachnoid granulations are located along the nerve roots of the spinal canal, in which case the CSF transits into the veins surrounding the nerve roots.

Hydrocephalus is a relatively neurological disease in which, for various reasons, the pressure of the CSF increases. Hydrocephalus can be communicating, where the CSF flow pathway is not interrupted but there is a deficit of the reabsorption of CSF by the arachnoid granulations. Hydrocephalus can also be caused by overproduction of CSF. Hydrocephalus can be secondary to an obstacle to the CSF circulation, which is called non-communicating hydrocephalus. Some hydrocephalus conditions are congenital, while others may be acquired (for example, after subarachnoid hemorrhage).

One approach to treating hydrocephalus is by diverting CSF. CSF diversion is commonly known as shunting and refers to the placement of a permanently (or semi-permanently) implanted shunt (e.g., a tube) that diverts CSF from the subarachnoid space to another area of the body where it can be reabsorbed. This surgery may be performed by neurosurgeons.

In addition to hydrocephalus, there are other diseases that also be treated by CSF diversion using the techniques described herein. For example, in some patients, brain ventricles may be contracted, resulting from a disease such as idiopathic intracranial hypertension (IIH). In some patients, ventricles may be enlarged while CSF pressure has not increased, resulting in a disease such as normal pressure hydrocephalus (NPH).

Conventional shunts may access the CSF via locations in the skull. However, the neurosurgery required to implant such shunts may be relatively risky. For example, when a shunt is to be positioned in an inferior petrosal sinus, such a procedure may have high risks and a failure could lead to a neurological complication or even death. Embodiments disclosed herein describe a delivery system and CSF shunt for placement outside of the cranial cavity. Particularly, embodiments herein disclose placing a CSF shunt in the spinal canal—e.g., in the lumbar region. The lumbar region includes multiple sites that can be accessed via endovenous catheters guided by X-Ray fluoroscopy to deliver and position the CSF shunt. The spinal region (e.g., lumbar region) may be a safer region to operate on and present lower risk, as opposed to brain surgery.

Notably, CSF shunts may fail at a relatively high rate (e.g., more than 50% over two years, and even larger percentages over longer periods of time). Further, when CSF shunts fail and otherwise need to be removed and/or replaced, the spinal region may again be a safer region (as compared to the cranial region) to perform a procedure, such as an endovenous procedure.

According to techniques herein, a cerebrospinal shunt has an inlet region and an outlet region. The inlet region is positioned in the intradural space within the thecal sac. The outlet region is positioned in a venous pathway. A venous pathway may be any pathway along the venous system. One example of a venous pathway extends along an intervertebral vein, to the lumbar vein, to an iliac vein or to a paraspinal vein, vena cava (e.g., the inferior vena cava or the superior vena cava), and the right atrium of the heart. Another example of a venous pathway extends along the epidural venous network of the spinal canal. Another example of a venous pathway extends along the azygos vein or one of its affluents or venous affluent of the inferior or superior vena cava.

According to techniques herein, an endovenous procedure is employed to implant a spinal-venous shunt for draining CSF from the intradural space to a vein, such as an epidural vein (vein of the spinal canal) or a vein surrounding the spine. The shunt may include a hollow tube having an inlet aperture in an inlet region within the intradural space. The inlet aperture may receive CSF at a higher pressure. The shunt may further include an outlet aperture in an outlet region. The outlet aperture may deliver the CSF received at the inlet aperture to a lower-pressure region. For example, the outlet aperture may be positioned in a venous pathway, such as positioned in an epidural vein, an intervertebral vein, lumbar vein or a vein proximate the spine, or a vein distant to the spine. The shunt may further include a transverse region including a channel between the inlet region and the outlet region. The channel may connect or otherwise enable fluid communication between the inlet aperture and the outlet aperture. The shunt may include one or more anti-reflux features (e.g., a valve and/or a flow-controlling element) and/or flow-limiting features.

According to techniques herein, a method to place a CSF shunt from an endovenous approach is provided. The approach may involve catheterizing a vein proximate the thecal sac, orienting the catheter towards the thecal sac, perforating the venous wall, perforating interstitial space, perforating the thecal sac, perforating the arachnoid membrane, and positioning the shunt through the perforations so that the inlet aperture is located within the intradural space and the outlet aperture is located in a vein surrounding or distant to the thecal sac.

According to techniques herein, to implant a CSF shunt a patient may be anesthetized or sedated and placed on an X-ray/fluoroscopy system (hereinafter, the fluoroscopy system) operating table. The surgeon or members of a surgical team (hereinafter, surgeon) may insert a needle into a vein (e.g., a vein in the patient's leg, neck, or arm). The surgeon may then place an introducer over the needle into the vein, and then extract the needle. As another example, the introducer may be arranged together with the needle such that the introducer is inserted at the same time as the needle. The surgeon may inject fluoroscopic contrast dye fluid into the patient. Using the fluoroscopy system, the surgeon may view the patient's venous system (or relevant portions thereof) on a display. The surgeon may determine a suitable route for performing the endovenous delivery and implantation of the CSF shunt. Such a suitable route may be via an epidural vein, an intervertebral vein, or a perivertebral vein.

FIG. 1 illustrates an anatomical region of the patient in the spinal area (e.g., lumbar region). Examples of an epidural vein and intervertebral vein are illustrated. The spinal area includes a spinal canal 10 (shown approximately), bones 12, nerves 14, nerve roots 16, fat and/or interstitial space 18, epidural veins 20, intervertebral veins 22, thecal sac 30, and cerebrospinal fluid 32. The interstitial space 18 includes fluid-filled space and non-fluid-filled space (such as fat, which is represented with stippled regions). As shown, the interstitial space 18 is anatomically located at least between the veins and the patient's dura which limits the thecal sac 28. The interstitial space 18 is made mostly of loose tissue and fat and small vessels, such as capillaries, arterioles, and venules.

Figure 2:
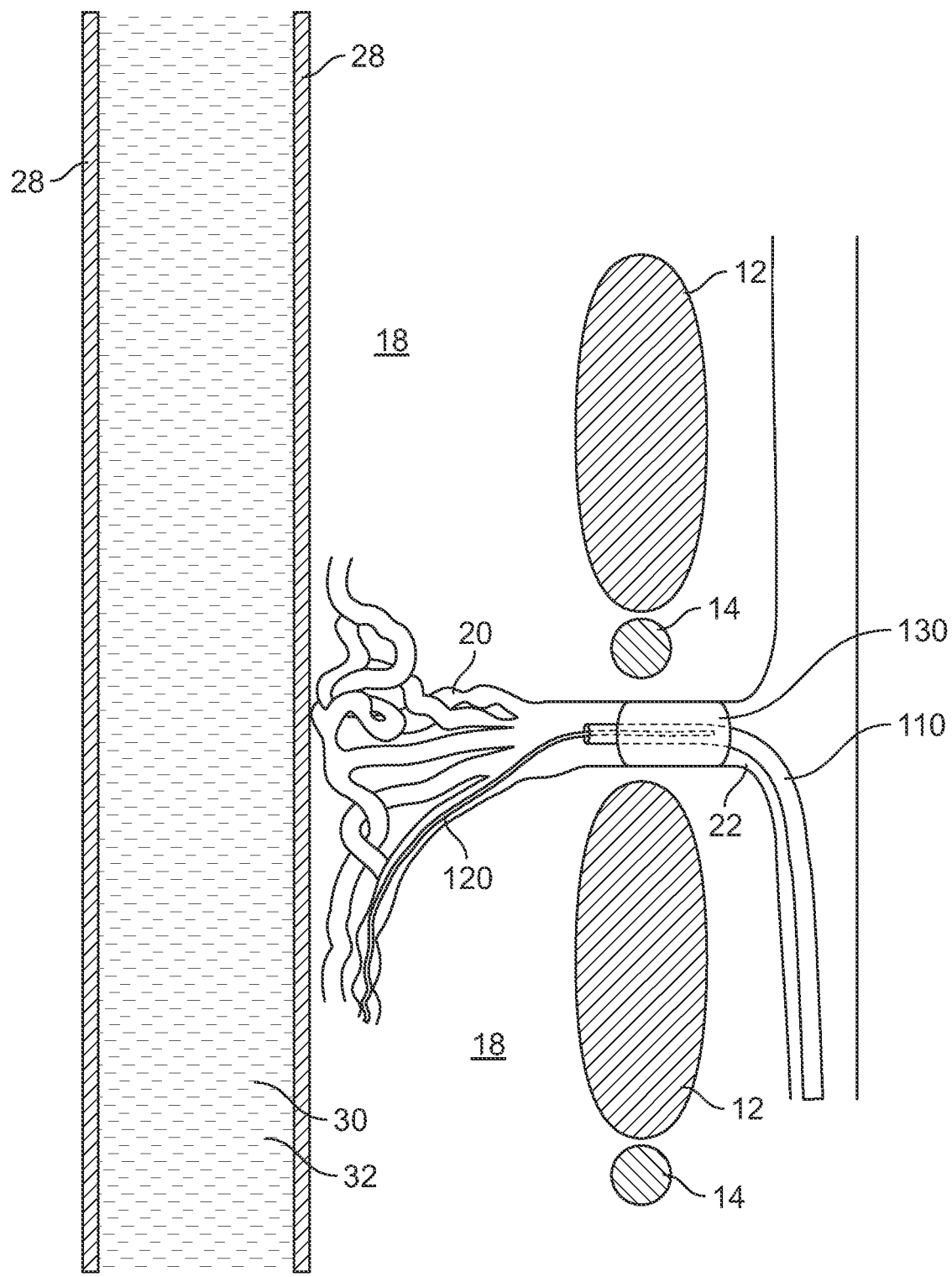
FIG. 2 illustrates a cross-sectional view of a patient's anatomy and a delivery system for a CSF shunt, according to embodiments.

FIG. 2 illustrates a distal portion of a shunt delivery system 100 (as shown, guide catheter 110, guide wire 120, and stabilizer 130) inside of a patient. The guide catheter 110 is positioned in a location where the tip of the guide catheter 110 is located suitably (for this example) in an intervertebral vein 22 and the guide wire 120 in an epidural vein 20. A stabilizer 130 is further shown. The guide catheter 110, the guide wire 120, and the stabilizer 130 form a portion of a shunt delivery system 100 to deliver a CSF shunt 200 to a suitable location, as will be further described. In order to locate the guide catheter 110 and the guide wire 120 at a suitable location, a surgeon may insert the guide catheter 110 with the accompanying guide wire 120 into an introducer (not shown). The guide catheter 110 and/or other components of the shunt 200 and shunt delivery system 100 may have one or more radio opaque or radiopaque markers 150 (R-O marker, not shown in FIG. 2), as will be further described. Radiopaque markers 150 may be readily detected visually by the surgeon through a fluoroscopy system's display such that the surgeon can visualize the system components in the patient's contrasted venous system. Radiopaque markers 150 may include one or more materials, such as platinum/iridium (90/10), gold, palladium, or substantially pure platinum (~99%).

One type of radiopaque marker 150 may be one or more threads (e.g., platinum/iridium thread(s)) that extend along a given component (e.g., substantially longitudinally). Such threads may be woven, implanted, embedded in, or attached to given components described herein, including one or more components of the shunt delivery system 100 and/or shunt 200. The radiopaque markers 150 discussed herein may facilitate visualization of the particular stage of a procedure by the surgeon through the fluoroscopy system's display, and may not need to be repeated every time a radiopaque marker 150 is described, herein. The guide catheter 110 may have a relatively flexible tip that may be radiopaque or have a radiopaque marker 150 (e.g., comprising platinum/iridium). Other portions of the guide catheter 110 may be relatively stiffer to enable maneuvering and insertion of the guide wire 120 into the patient. The surgeon may guide the guide catheter 110 through the veins while, for example, viewing the process in real-time on the display. Once the tip of the guide catheter 110 has been positioned a suitable location (e.g., intervertebral vein, perispinal vein, epidural vein, or in another suitable location in a venous pathway), the surgeon may cause a distal portion of the guide catheter 110 to be anchored at a suitable location (e.g., intervertebral vein, perispinal vein, epidural vein, or in another suitable location in a venous pathway).

As an alternative, the catheterization may be performed with a catheter (not shown) with a guide wire 120, and the catheter may be exchanged over the guide wire 120 for a guide catheter 110. The guide catheter 110 may have one or more radiopaque markers 150, and the surgeon may position the guide catheter 110 while viewing the process on the fluoroscopy display, such that the guide catheter's 110 distal end is in a suitable location (e.g., intervertebral vein, perispinal vein, or epidural vein). The guide catheter 110 may range from approximately 3 Fr to 7 Fr in diameter, for example, depending on the size of the relevant vein(s). The guide catheter may be relatively short (e.g., less than 50 cm) through relatively long (e.g., greater than 90 cm). The length of the guide catheter 110 may be chosen according to the surgical access point. As an example, if a femoral vein is chosen for the endovenous procedure and the implantation site is in the lumbar region, the guide catheter 110 may be relatively short (e.g., 30-50 cm). If a brachial vein is used and the shunt 200 is to be implanted in the lumbar region, the guide catheter 110 may be relatively long (e.g., 150 cm).

The guide catheter 110 may include a guide catheter stabilizer 130 (or stabilizer) in a distal region of the guide catheter 110. Such a guide catheter stabilizer 130 may include a balloon or a mesh expansion device, or a stiffening element or component. The guide catheter stabilizer 130 may have one or more radiopaque markers 150 for viewing on the fluoroscopy system display. The guide catheter stabilizer 130 may include one or more different materials, including Pebax, polyurethanes, and/or silicone elastic, for example. When the guide catheter stabilizer 130 includes a balloon, the balloon may be oriented substantially coaxially around the guide catheter 130 or may be biased towards one or more sides. In addition, there may be two or more balloons (e.g., each independently controlled) on the guide catheter 110 distal region. In such a case, each stabilizer 130 may extend less than 360° around the guide catheter 110 (e.g., one balloon on top and one balloon on bottom, each extending 180° around the guide catheter 110). If multiple balloons are used, each may be separately inflated. Such inflation may facilitate the surgeon to direct and orientate the guide catheter 110 distal region (e.g., tip). The balloon(s)

may be inflated through luers on the proximal handle or via luers on or in the guide catheter 110.

Alternatively or in addition, the guide catheter 110 tip may be oriented and fixated using a mechanical system. For example, a mechanical system may eliminate the need for a stabilizer 130.

Once the guide catheter stabilizer 130 is in a suitable location, the surgeon may cause the guide catheter stabilizer 130 to deploy (e.g., cause a balloon anchor to inflate) in order to stabilize the guide catheter 110 into a suitable location in a vein, and if indicated, to orient the guide catheter 110, e.g., so that its long access is in the center or off center of the primary axis of the vein. After the guide catheter 110 has been suitably located and/or stabilized, the surgeon may remove the guide wire 120 from the patient. FIG. 2 illustrates an example of a guide catheter 110 having been positioned and stabilized via the guide catheter stabilizer 130 (inflated balloon in this example) in an intervertebral vein 22. Stabilization may be performed prior to withdrawing the guide wire 120.

Figure 4:
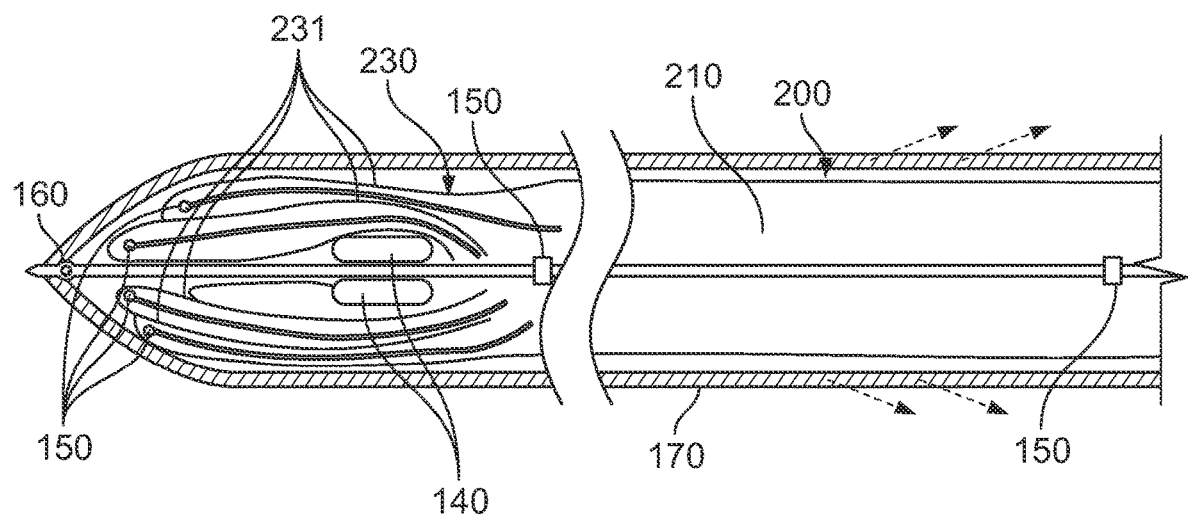
FIG. 4 illustrates a longitudinal cross-sectional view of a portion of a shunt and shunt delivery system, according to embodiments.

After positioning and stabilizing of the guide catheter 110, the surgeon may introduce additional portions of a shunt delivery system 100 into the proximal end of the guide catheter 110. FIG. 4 illustrates a longitudinal cross-sectional view of some additional components of an exemplary shunt delivery system 100 and a shunt 200. The shunt 200 may include a shunt body 210, which in turn may include an inlet region 212 and inlet aperture 211 therein, which will receive CSF 32 from within the intradural space 30. The inlet region 212 of the shunt body 210 may be distally located during the implantation procedure. The shunt body 210 may further include an outlet region 214 and an outlet aperture 213 therein, which will pass the received CSF 32 from the inlet aperture 211 to an intravenous region of the patient, once the shunt 200 has been implanted. The shunt body 210 may further include a transverse region 215 between the inlet region 212 and the outlet region 214. The transverse region 215 may include a channel which enables fluid communication between the inlet aperture 211 and the outlet aperture 213, thereby allowing for CSF 32 to flow through the shunt body 210 once implanted.

The shunt body 210 may include a material such as polyurethane, silicone and/or nitinol. The shunt body 210 may include or be coated with a material on an exterior region and/or an interior region that reduces coagulation of blood, aggregation of proteins, and/or aggregation of cells. Such a material may be antithrombotic and may include a material or compound such as Plavix or heparin.

As shown in FIG. 4, the shunt 200 may include an anchor 230, which may facilitate stabilization of the shunt 200 once it is fully implanted. The anchor 230 may include a plurality of anchor fingers 231, which may have one or more radiopaque markers 150. In or on one or more of the anchor fingers 231, an anchor wire 232 may be included. The function, deployment, and operation of the anchor 230 will be further described.

As shown in FIG. 4, the shunt delivery system 100 may further include a limiter 140. The limiter 140 may also include one or more radiopaque markers 150 (not shown). The function, deployment, and operation of the limiter 140 will be further described.

As shown in FIG. 4, the shunt delivery system 100 may further include a sheath 170 (e.g., a retractable sheath) exterior to some or all portions of the shunt 200. The sheath 170 may have one or more radiopaque markers 150 (not shown in FIG. 4, but shown in FIGS. 8A and 8B). The sheath 170 may include a distal region (distal from the surgeon) and/or distal tip suitable for perforating or facilitating perforation of portion(s) of patient's anatomy. The sheath 170 may operate in conjunction with the inner wire 160 to perforate or facilitate perforation. The sheath 170 may be coated with or may include a lubricious material, such as ones described herein. For example, the sheath 170 may have a laminate construction, where the inner layer of the laminate proximate the shunt 200 comprises a lubricious material such as PTFE. Such a lubricious material may facilitate removal of the sheath 170 from the shunt 200. Outside of the lubricious material layer may be a harder layer and/or wire braids in the layer to improve stiffness, pushability, and/or trackability. Outside of the harder layer may be one or more additional layers suitable for different purposes.

As shown in FIG. 4, the shunt delivery system 100 may further include an inner wire 160 that extends through the shunt body 210 (e.g., through the outlet aperture 213, the transverse channel 215, and the inlet aperture 211). The inner wire 160 may include one or more radiopaque markers 150. The inner wire 160 may include a distal region and/or tip 162 suitable for perforating or facilitating perforation of portion(s) of the patient's anatomy. The inner wire 160 may include a hollow tube running through the inner wire 160, including an inlet aperture and an outlet aperture. The inner wire 160 may be include either bio-metals and/or bio-plastics, and/or may contain a movable and/or removable stylet 165 inside. The stylet 165 and/or the hollow tube may include nitinol (e.g., super-elastic nitinol) to enhance flexibility or pushability.

Figure 13A:
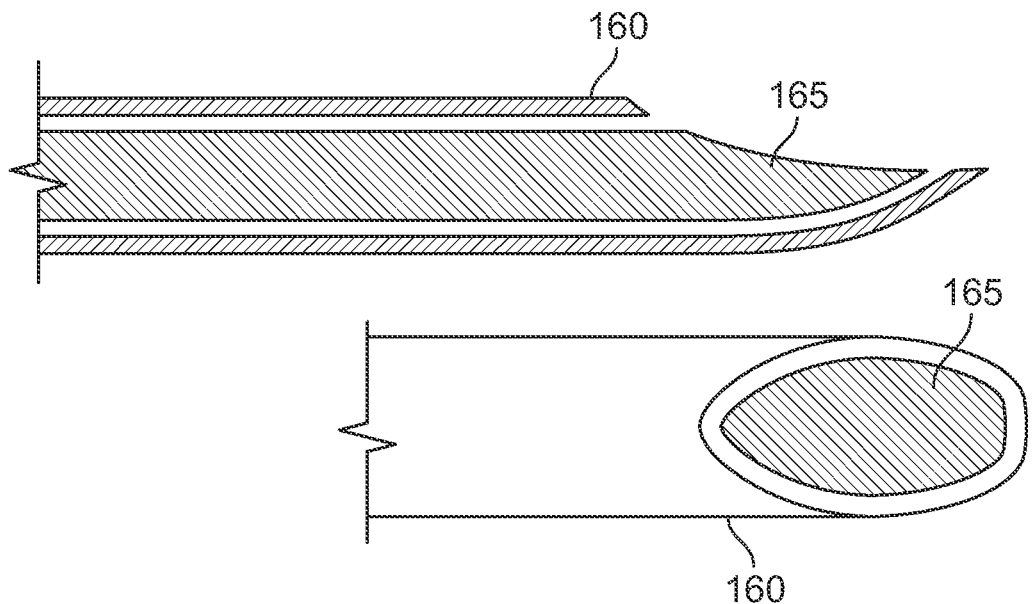
FIGS. 13A, 13B, 13C, and 14 show inner wires and stylets, according to embodiments.
Figure 13B:
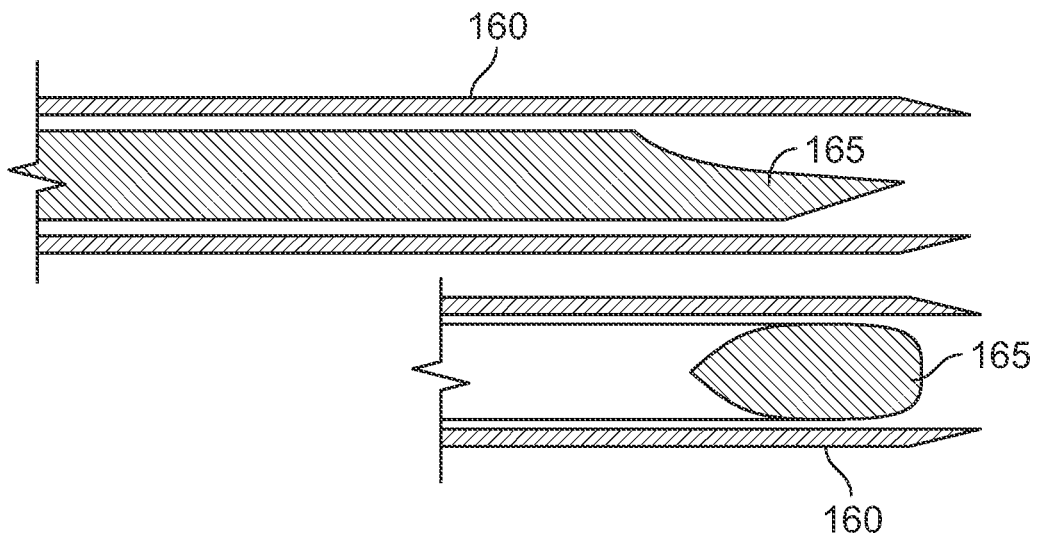
Figure 13C:
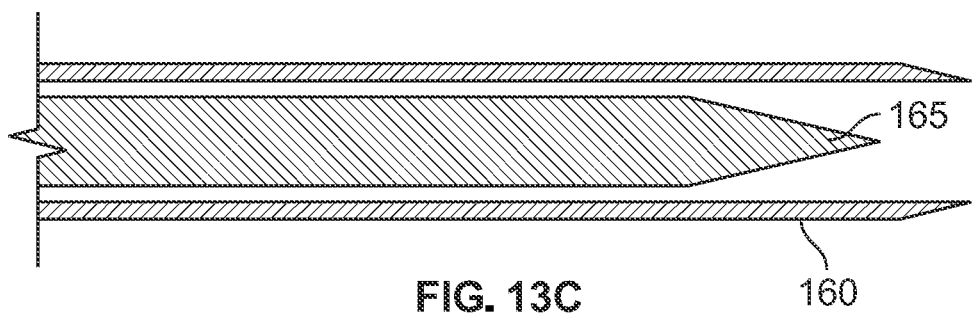
Figure 14:
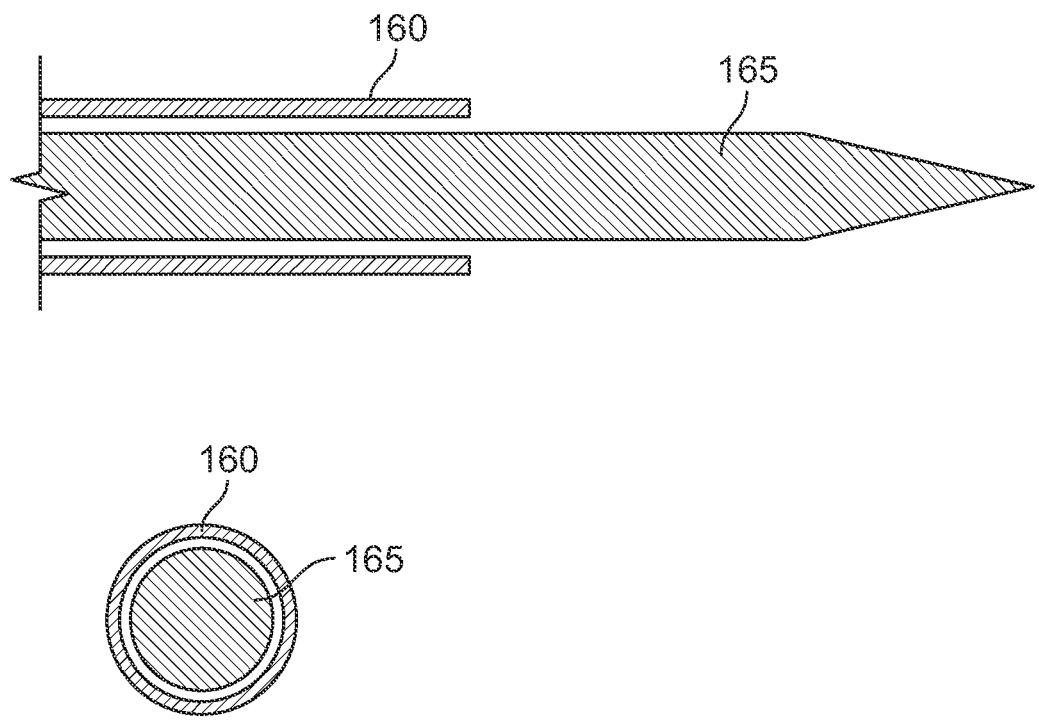

FIGS. 13A and 13B illustrate cross-sectional views and top views along the primary axes of different embodiments of the inner wire 160 and the stylet 165. FIG. 13C illustrates a cross-sectional view along the primary axis of the inner wire 160 and the stylet 165, according to embodiments. FIG. 14 shows cross-sectional views along the primary axis and the axial direction of the inner wire 160 and the stylet 165, according to embodiments. As shown in FIG. 13A, the distal region of the inner wire 160 may include a rounded or shovel shape. The edge(s) of the distal tip of the inner wire 160 may be sharp (e.g., razor-like). The edge(s) of the distal tip of the inner wire 160 may include bevel(s). Other configurations of the inner wire 160 and/or the stylet 165 are shown in FIGS. 13B (a type of irregular tip) and 13C (conical tip). After advancing the inner wire 160 through the thecal sac 28 (and/or advancing the inner wire 169 further forward into the intradural space 30 to provide additional stability for deploying the shunt 200), the stylet 165 may be removed, thus clearing an inner, hollow pathway and allowing the surgeon to be able to withdraw CSF 32 to confirm that the distal tip of the inner wire 160 is in the intradural space. In this embodiment, the CSF 32 flows through the hollow tube in the inner wire 160. By removing the stylet 165, this may also permit drug delivery and/or contrast delivery for confirmation of location in the intradural space 30 and/or pressure monitoring/reading via the hollow interior region of the inner wire 160.

The stylet 165 may include a distal, sharp tip (e.g., razor-like). In such a case, the inner wire 160 may (or may not) have a rounded edge (e.g., not like a razor). The stylet 165 distal tip may be beveled, faceted, semi-shovel shaped (FIG. 13B) or conical (FIG. 13C) to create a sharp tip, which may be advantageous for penetrating tissues. In other embodiments, the stylet 165 may have a distal tip that is trocar shaped or screw shaped. When a screw shape is used, the stylet 165 and/or inner wire 160 may be rotated to facilitate puncturing tissue. The stylet 165 may be coated or include a material (such as PTFE) to enhance lubricity and promote movement. While positioning the shunt 200 for puncture, the stylet 165 may reside contained and locked (via the handle) in the inner wire 160. Once the inner wire 160 is in positioned in a vein and before puncturing the vein wall, the stylet 165 may be advanced to create an aperture, cut, and/or opening in one or more tissues between the vein and the CSF 32 (e.g., vein wall, interstitial space 18, and/or thecal sac 28). These apertures, cuts, and/or openings may facilitate advancement of other portions of the shunt 200 and/or shunt delivery system 100. For example, they may facilitate dilatation of one or more portions of the shunt 200 to enlarge one or more portions of the hollow interior region of the shunt 200. Such a technique may allow for portion(s) of the shunt 200 to collapse (for example, when encountering a region where the channel dimension(s) are less than the uncollapsed outer diameter(s) of the shunt 200) while navigating the shunt 200 to its final implantation location. After puncture, the stylet 165 may be partially or fully retracted.

While a stylet 165 is disclosed, the inner wire 160 itself may perform puncturing without the stylet 165. In such a configuration, the inner wire 160 may be a type of stylet. In such an embodiment, the inner wire 160 may not be hollow, but rather solid, or at least not have a hollow channel traversing the length of the inner wire 160. According to another embodiment, the inner wire 160 and the stylet 165 may each provide a puncturing function.

The surgeon may navigate the shunt delivery system 100 may further include a handle (not shown) outside of the patient. The surgeon may interact with the handle to move the stylet 165 forward (and/or backward) by a controlled distance. The handle may also include a lock-out/lock-in engagement feature to ensure that the stylet 165 can may move forward/backward when the surgeon engages. The handle may further include a luer for fluid connection with the inner wire 160. The handle may further include a mechanism (e.g., a lock in/lock out twisting mechanism) for removing the stylet 165 from the shunt delivery system 100. Thus, the stylet 165 position may be locked unless purposefully engaged by the surgeon.

The inner wire 160 may operate in conjunction with the sheath 170 and/or shunt distal region to perforate or facilitate perforation of the patient's anatomy (e.g., perforation of vein wall, tissue in interstitial space 18, or thecal sac 28). The inner wire 160 may further serve to position the shunt delivery system 100 into a suitable location. Not shown, the inner wire 160 may include or be attached to a handle at a region proximal to the surgeon (e.g., not inside of the patient). The surgeon may engage with the handle to move the inner wire 160 and the entire shunt delivery system 100 into a suitable location. The handle may be the same handle described above in conjunction with the stylet 165.

Figure 8A:
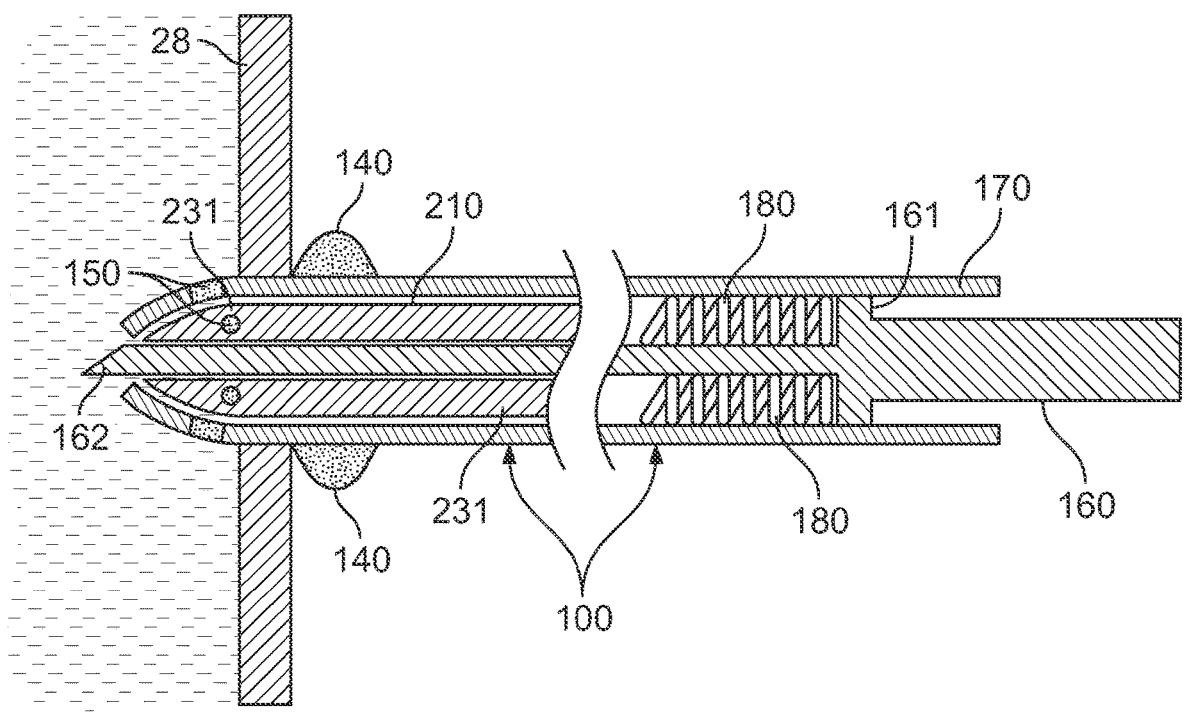
FIGS. 8A and 8B illustrate a cross-sectional view of a patient's anatomy and a sequence for locating a CSF shunt in the patient, according to embodiments.
Figure 8B:
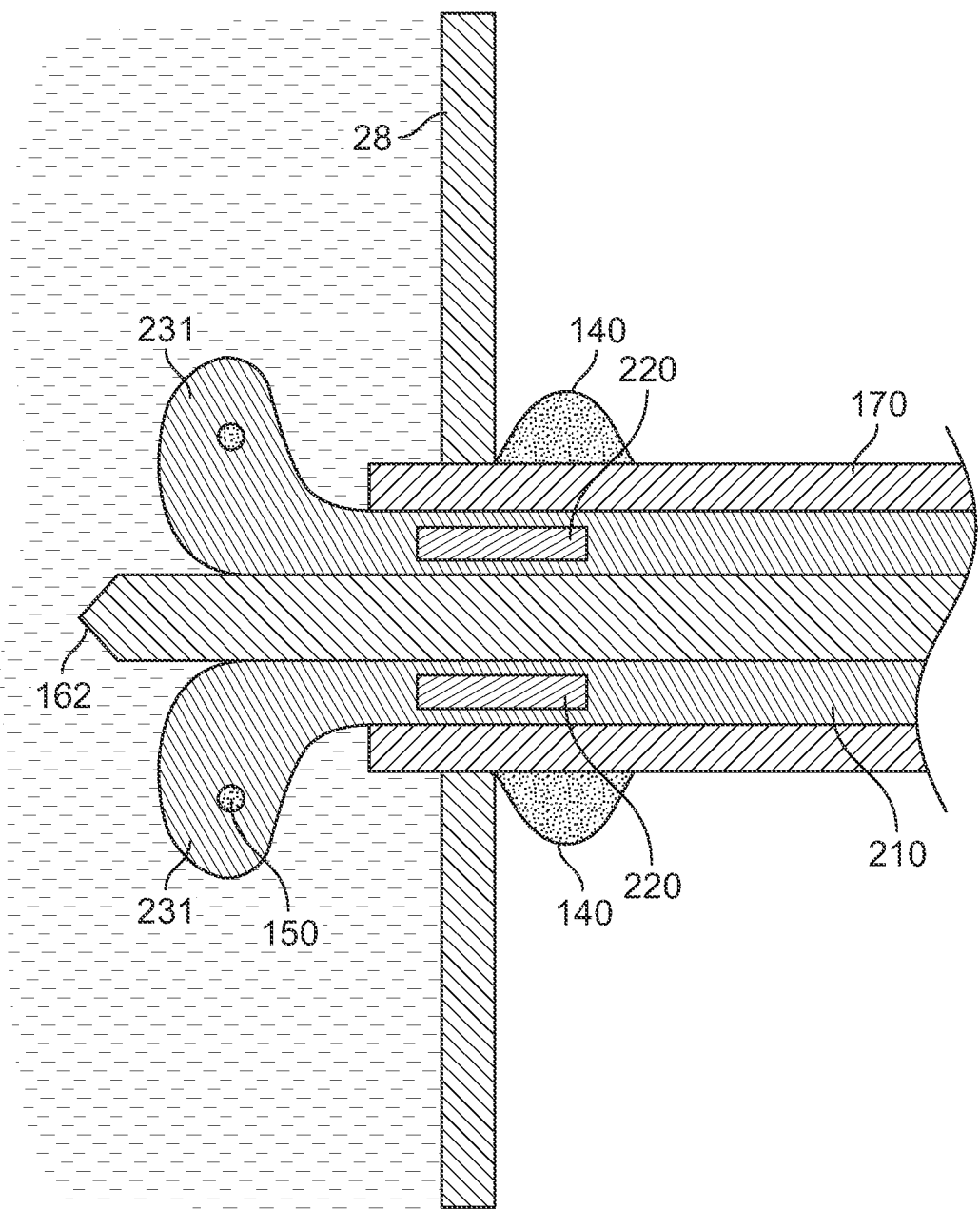

As shown in FIG. 8A (which includes a longitudinal cross-sectional view of the shunt delivery system 100), the inner wire 160 may include a shoulder. As the surgeon moves the shunt delivery system 100 (e.g., via the handle) to the inner wire 160, the inner wire 160 shoulder may engage with the shunt body 210 (e.g., the outlet region 214 of the shunt body 210) and/or an intermediate spring 180 between the inner wire 160 and the shunt body 210 (which is not shown in FIG. 8A, although understood from FIG. 4). In such a way, the inner wire 160 shoulder may cause the shunt delivery system 100 to be suitably maneuvered and positioned.

Figure 3A:
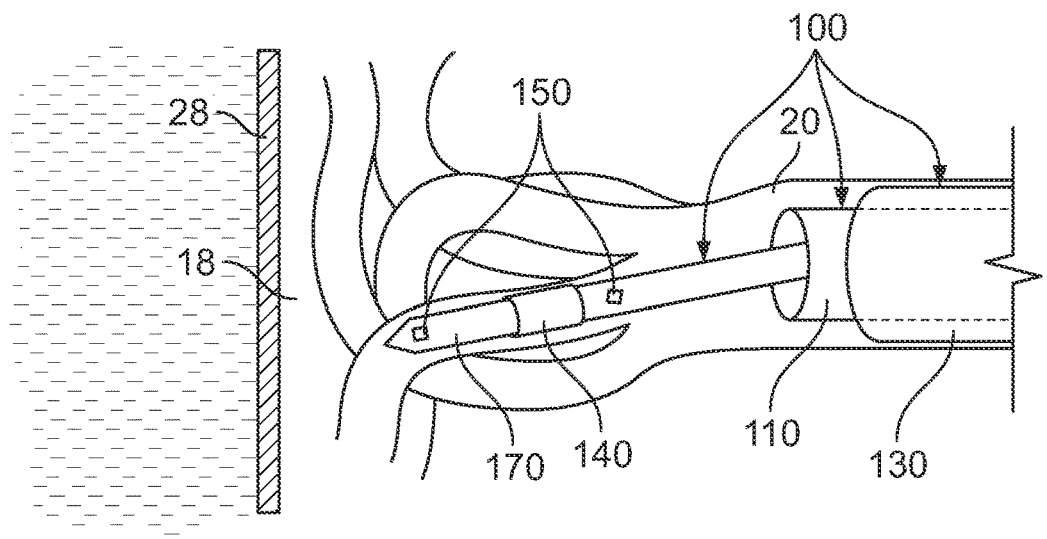
FIGS. 3A, 3B, and 3C illustrates a cross-sectional view of a patient's anatomy and a sequence for positioning a CSF shunt, according to embodiments.
Figure 3B:
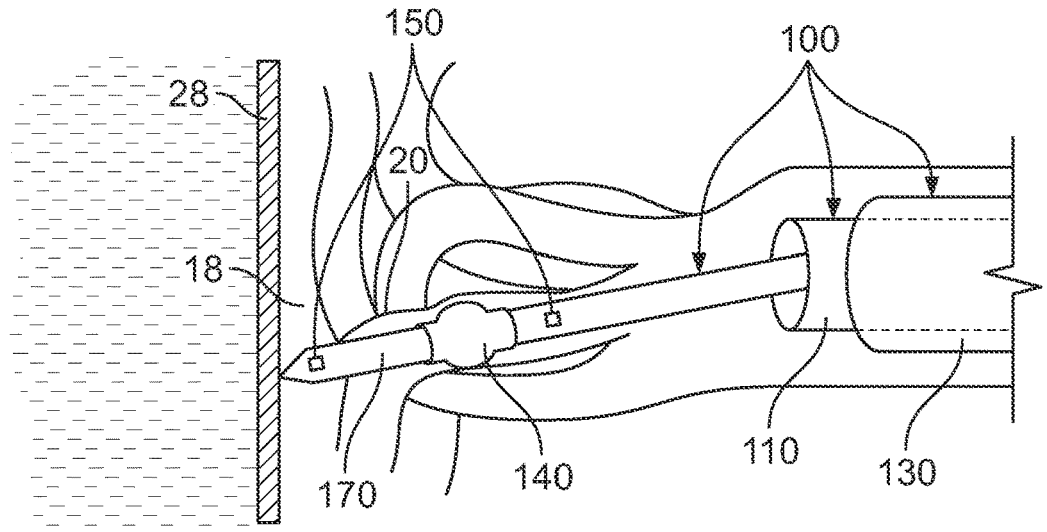
Figure 3C:
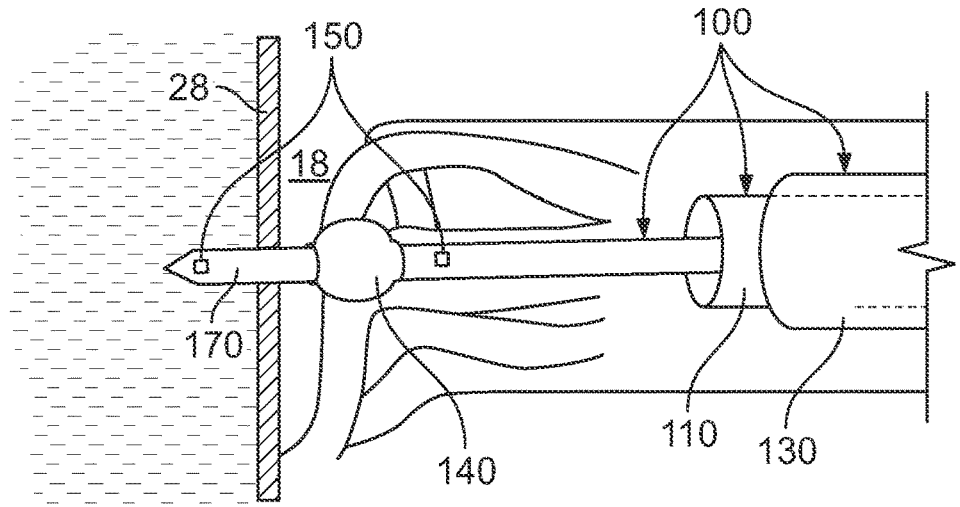

An exemplary sequence of positioning the shunt delivery system 100 is illustrated in FIGS. 3A, 3B, and 3C. At FIG. 3A, the shunt delivery system 100 is advanced by the surgeon at least partially out of the distal end of the guide catheter 110 after the guide catheter 110 has been stabilized in the vein by the stabilizer 130. The exterior surface of the shunt delivery system 100 includes the sheath 170 with radiopaque markers 150 so the surgeon can readily visualize positioning of the shunt delivery system 100 in the patient. The exterior of the shunt delivery system 100 may also include an exterior surface of the limiter 140. The exterior surface of the limiter 140 may be integrated with or may be a portion of the sheath 170. The limiter 140 may have radiopaque markers (not shown) 150.

Subsequent to FIG. 3A, the surgeon advances the shunt delivery system 100 such that the distal end of the shunt delivery system 100 (e.g., inner wire 160 and/or sheath 170) perforates or is moved through the vein wall, such that the distal end becomes positioned in the patient's interstitial space 18 near the thecal sac 28 as shown in FIG. 3B. At this stage, the limiter 140 may be deployed (e.g., expanded or inflated) by the surgeon. The limiter 140 may be a structure or feature that prevents over-insertion of the shunt delivery system 100 through the thecal sac 28 and into the intradural space 30, or may otherwise regulate the distance the shunt delivery system 100 can be inserted into the subarachnoid space. The limiter 140 may be an expandable bulge with an outer diameter larger than an outer diameter of the sheath 170. The limiter 140 may include a wire cage/tube (e.g., flexible nitinol) that when compressed, expands out in the middle or of a rubber material that when compressed expands in the middle.

The surgeon may be able to remotely deploy the limiter 140 from outside of the patient. The surgeon may be able to remotely deploy the limiter 140 via an actuator on the handle, such as a turning mechanism (e.g., on the proximal handle end) that when turned, engages the limiter 140 to expand. As another example, the limiter-deploying mechanism may include a lever that, when moved one way (e.g., pushed forward) engages the limiter 140 to expand, and when moved a different way (e.g., pulled in reverse) disengages the limiter 140 to contract. The limiter-deploying mechanism may include a clicker, and may include a governor to prevent over-inflation. The limiter 140 may be at least partially deployed or fully deployed while it is located in the vein and/or interstitial space 18. The limiter 140 may be at least partially deployed or fully deployed while it is located in the interstitial space 18.

Subsequent to FIG. 3B, the surgeon advances the shunt delivery system 100 such that the distal end of the shunt delivery system 100 (e.g., inner wire 165 and/or sheath and/or shunt 200 head) perforates or is moved through the vein wall, and through the interstitial space 18, such that the distal end becomes positioned in the intradural space 30, as shown in FIG. 3C. The limiter 140 may be fully deployed before the shunt delivery system 100 is fully positioned in a suitable location. The limiter 140 may prevent over-insertion by virtue of its outer diameter being larger than the aperture through the thecal sac 28 caused by perforation from the shunt delivery system 100. FIG. 4 illustrates a portion of limiter 140 positioned inside of the sheath 170. As depicted, the limiter 140 may be a balloon that can selectively be inflated (e.g., under control of the surgeon). When the balloon expands, it may cause the exterior surface of the sheath 200 to expand to provide an effect such as shown in FIGS. 3B and 3C.

FIG. 8A depicts a stage of deployment of the CSF shunt 200 using the shunt delivery system 100. The limiter 140 is shown as a feature on the exterior of the sheath 170. This embodiment of a limiter 140 may be different than other depicted limiters 140 herein. The limiter 140 may be a relatively small, inflatable balloon. As another example, the sheath 170 may be constructed such that, when advanced forward a predetermined distance (e.g., via the handle) the sheath 170 may buckle (e.g., a small corrugated section in the sheath may promote buckling) to create a limiter 140. As shown, the inner wire 160 may puncture the thecal sac 28 and optionally with assistance from the sheath 200 (not shown) to create a suitable aperture in the thecal sac 28.

There may be different techniques for implanting the shunt 200. According to one method, the sheath 170 is removed and the shunt 200 is exposed. For example, once the system has penetrated the thecal sac 28 (e.g., seen via live x-ray), and has the shunt 200 in place, the surgeon may loosen a coupler (e.g., grommet) that allows the inner wire 160 and/or shunt 200 to move independently from the sheath 170. The surgeon may remove slack in the system, and then, with one hand locking the handle in place on the operating table (e.g., the handle may move), and with the other hand on the Y-adapter, the surgeon may slide the Y-adapter back towards the handle (with the other hand) and move the sheath 170 away from the shunt 200, thus exposing the shunt 200 (e.g., 10 to 20 mm). Through such locking, the inner wire 160 may remain stationary.

According to another method, the shunt 200 may be advanced out of the sheath 170. For example, once the system has penetrated the thecal sac 28, the surgeon may loosen a coupler (e.g., grommet) that allows the inner wire 160 and/or shunt 200 to move independently for the sheath 170. The surgeon may push the handle forward, thus positioning the shunt 200 in its final position. Once the shunt 200 is positioned, the surgeon may lock the handle in place and retract the remaining sheath 170 portion away from the shunt 200 and out of the patient.

Figure 5:
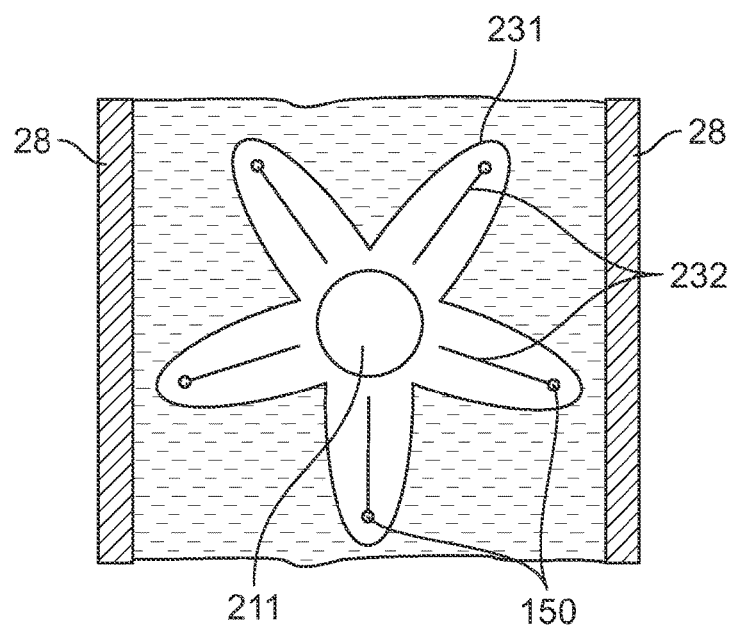
FIG. 5 illustrates a cross-sectional view of a patient's anatomy and a portion of a CSF shunt in its final location, according to embodiments.

As illustrated in FIG. 5, the anchor 230 of the shunt 200 has been deployed within the intradural space 30. The anchor 230 may include a plurality of fingers 231. Each anchor finger 231 may be provided with at least one anchor wire 232 and may have one or more radiopaque markers 150. The anchor wires 232 may be formed from or include a material such as nitinol. The anchor wires 232 may be flexible and may have memory. The anchor wires 232 may function as springs. When the anchor fingers 231 and anchor wires 232 therein or thereon are sheathed by the sheath 170, they may store energy. When the anchor wires 232 are unsheathed, they may tend to relax, thereby causing the anchor wires 232 to spread out (along with the anchor fingers 231) away from a longitudinal axis of the shunt body 210. The anchor wires 232 may attempt to return to their original memory position, thereby causing the anchor fingers 231 to unfurl such that they at least partially abut the thecal sac 28. The force of the anchor fingers 231 on the thecal sac 28 may tend to stabilize the shunt 200. The anchor wires 232 may not fully return to their original memory position, thereby facilitating a relatively secure contact between the anchor fingers 231 and the inner surface of the thecal sac 28. Upon completion of the insertion process (or before), the shunt inlet aperture 211 may be in fluid communication with the intradural space 30. In such a way, the shunt inlet aperture 211 may receive CSF 32.

Figure 7A:
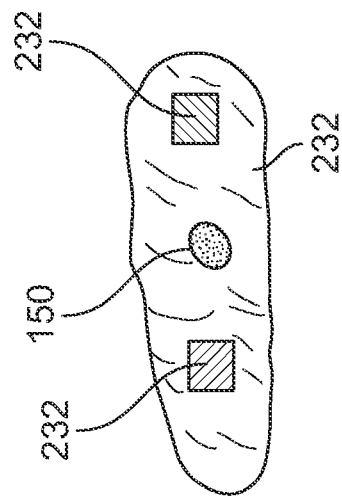
FIGS. 7A, 7B, 7C, and 7D illustrate axial cross-sectional views of different CSF shunt designs, according to embodiments.
Figure 7B:
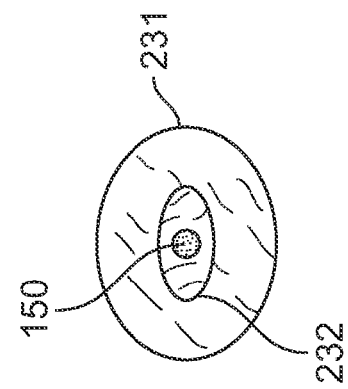
Figure 7C:
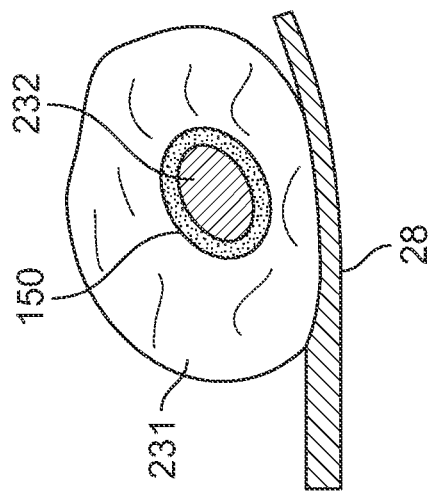
Figure 7D:
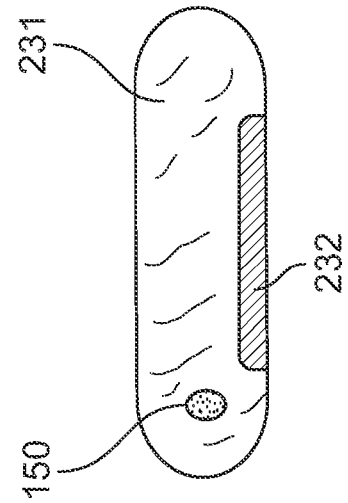

FIGS. 7A, 7B, 7C, and 7D illustrate axial views of various embodiments of anchor fingers 231. FIG. 7A illustrates a substantially rounded finger 231, which may include a bio-polymer (e.g., silicone, urethane, or the like) with an annular radiopaque marker 150 (shown as ring, for example) around a rounded anchor wire 232 (although other shapes are possible). The anchor wire 232 may be constructed from one or more elastic metals or of bio-polymers, for example. The anchor wire 232 may have memory, or may otherwise act as a spring. FIG. 7B illustrates an anchor finger 231 with two anchor wires 232, although more anchor wires 232 are possible. The anchor wires 232 are shown with a square or rectangular shape, although other shapes are possible. The anchor finger 231 may include a radiopaque marker 150, which may be an embedded bead or a length or wire or other arrangement. FIG. 7C shows an anchor finger 231 with a flattened anchor wire 232 along with a radiopaque marker 150 that could be a bead or a length wire, or another arrangement. FIG. 7D illustrates that the radiopaque marker 150 may be contained inside of a wire.

Figure 6:
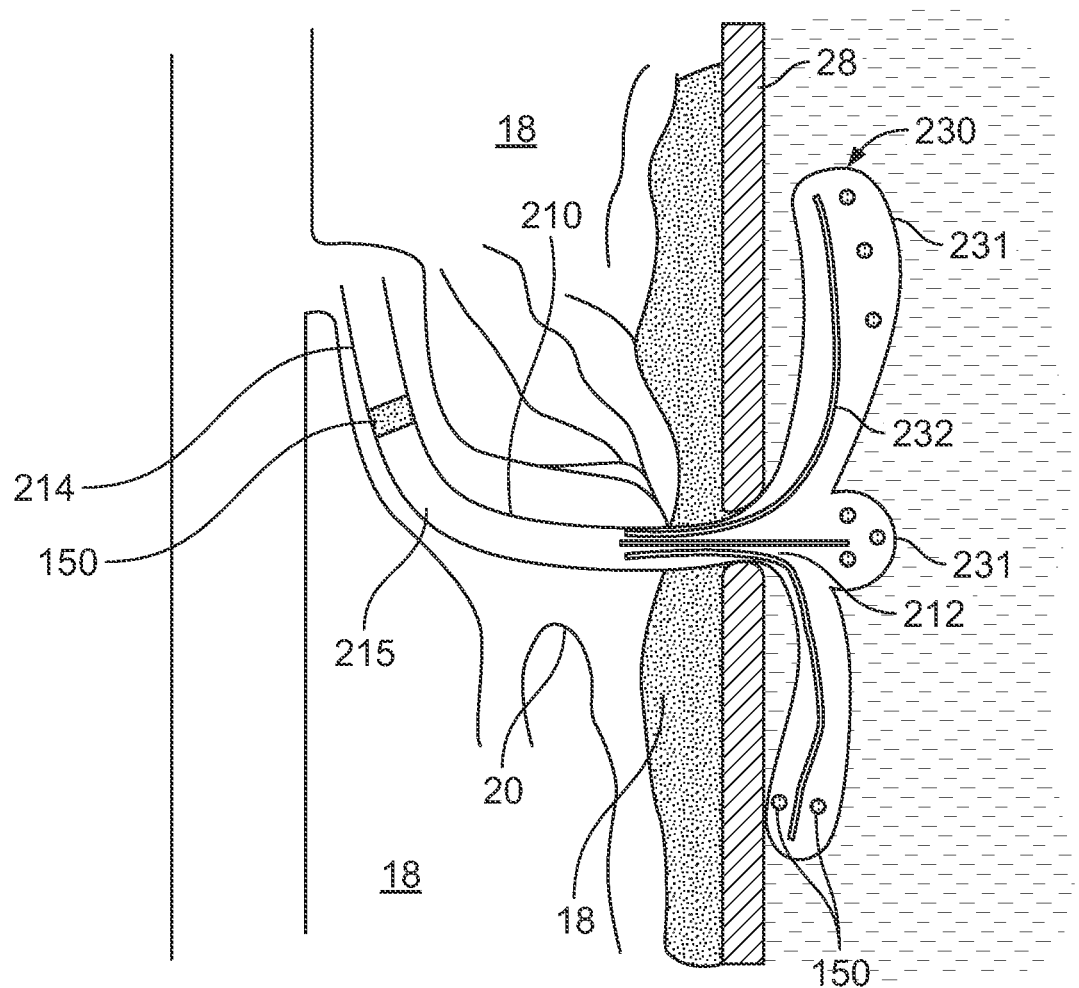
FIG. 6 illustrates a cross-sectional view of a patient's anatomy and a CSF shunt in its final location, according to embodiments.

FIG. 6 illustrates an example of the shunt 200 in its final position in situ. The shunt inlet region 212 may be positioned within the intradural space 30, along with the anchor fingers 231 (and accompanying anchor wires 232 and radiopaque markers 150). The shunt inlet aperture 211 may also optionally be positioned within the intradural space 28, or outside, such as within the aperture through the thecal sac 28. The shunt transverse region 215 may extend through an interstitial space 18, a vein wall, and a portion of one or more veins. The shunt outlet region 214 and shunt outlet aperture 213 may be positioned in a vein.

The shunt 200 may have various dimensions. For example, the length of the shunt body 210 may be between 5 mm to 150 cm. According to embodiments, the shunt body 210 may be less than 100 mm. Such a length may be advantageous because this may decrease the length of the shunt body 210 in contact with blood to decrease the risk of clotting. In addition, a shorter shunt 200 may decrease the residence time of given portions of the CSF fluid 32 in the shunt 200, thereby potentially reducing protein accumulation which could narrow the inner hollow region of the shunt 200 and/or interfere with (e.g., clog) the operation or structure of an anti-reflux valve 240 of the shunt 200. The length of an anchor finger 231 may be between 1 mm to 2 cm. The inner diameter of the transverse region of the shunt 215 may be between 0.05 mm to 1 mm. The portion of the shunt 200 that extends through the thecal sac 28 may be between 270 µm to 100 mm. The portion of the shunt 200 that extends through interstitial space 18 may be between 0.1 mm and 10 mm. The portion of the shunt 200 that extends through the vein wall may be between 0.1 mm and 0.5 mm. The portion of the shunt 200 that extends through intravenous space (along a venous pathway) may be up to 150 cm.

Figure 9A:
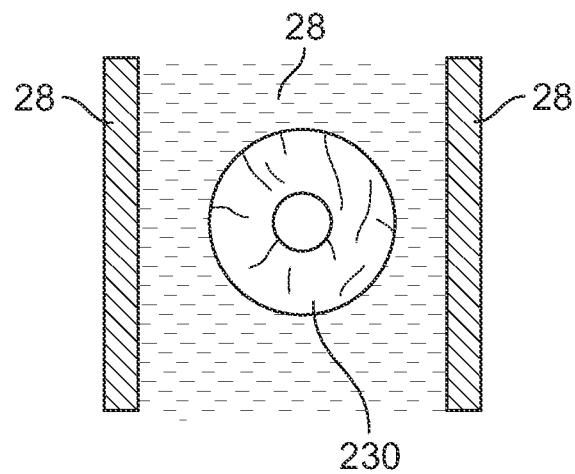
FIGS. 9A and 9B illustrate different cross-sectional views of a CSF shunt located in a patient, according to embodiments.
Figure 9B:
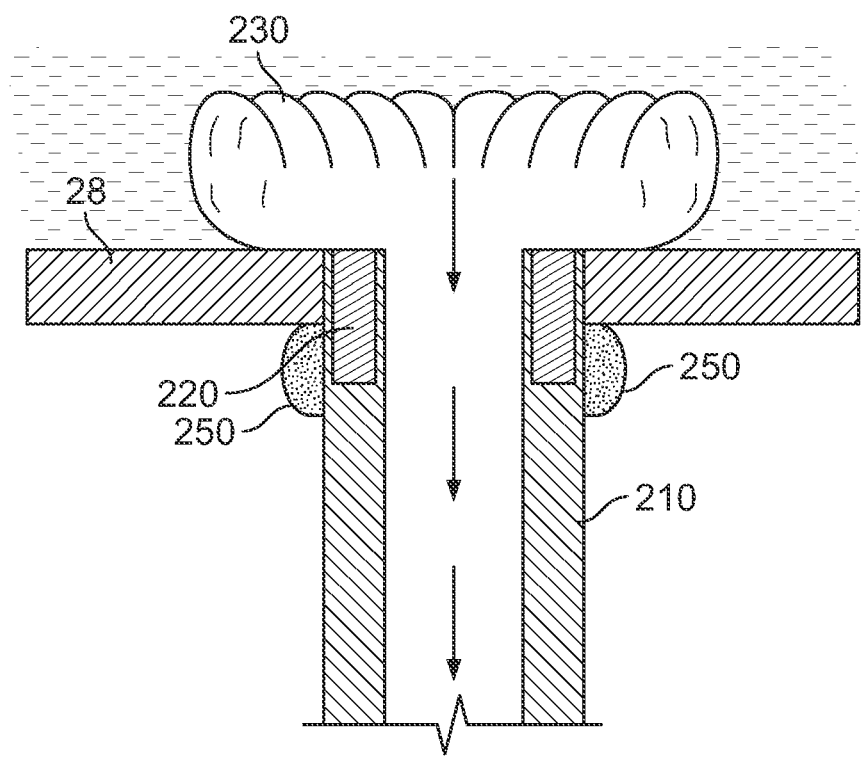

FIGS. 9A and 9B illustrate different views of an embodiment of a shunt 200 in its final position in situ. In this embodiment, the anchor 230 may not have fingers. Instead, it may operate by expanding into a doughnut shape or round gasket-like shape or similar to anchor the shunt 200 to the inside of the intradural space 28. Per this mechanism, the distal shunt region may be pre-shaped (e.g., as shown in FIG. 9B) prior to loading in the shunt 200 into the guide catheter 110. Thus, the anchor 230 may be compressed or deformed in a distal region of the guide catheter 110 and may be at least partially contained by the sheath 170 prior to deployment. Once the sheath 170 is retracted (or the shunt 200 is advanced), the distal area of the shunt 200 may revert to its original shape, as shown in the example of FIG. 9B. As shown in FIG. 9B, the shunt 200 may further include a strengthener 220 that extends across the aperture in the thecal sac 28. The strengthener 220 may extend into the interstitial space 18 and/or the intradural space 30. The strengthener 220 may be embedded in or form a portion of the shunt body 210 or other portions of the shunt 200. The strengthener 220 may tend to prevent collapsing or compressing of the shunt 200 (e.g., the shunt body 210 and e.g. due to pressure from the thecal sac 28). The strengthener 220 may include a material having a relatively high durometer (e.g., higher than certain other portions of the shunt body). Examples of material(s) included in strengthener may include PTFE, HDPE, a wire braided tube, a radiopaque embedded metal tube, and/or the like. The length of the strengthener 220 may be, e.g., 1 to 20 mm, and may substantially maintain the inside diameter (ID) of the shunt 200 open (e.g., shunt body 210), even with thecal sac 28 compression.

As further shown in FIG. 9B, the shunt 200 may include an exterior anchor 250 that may work in conjunction with the anchor 230 to promote stabilization of the shunt 200. The exterior anchor 250 may be pre-shaped (e.g., with a shape as shown in FIG. 9B) prior to loading in the sheath 170, and may deploy in a manner similarly to the anchor 230 described above.

Figure 10A:
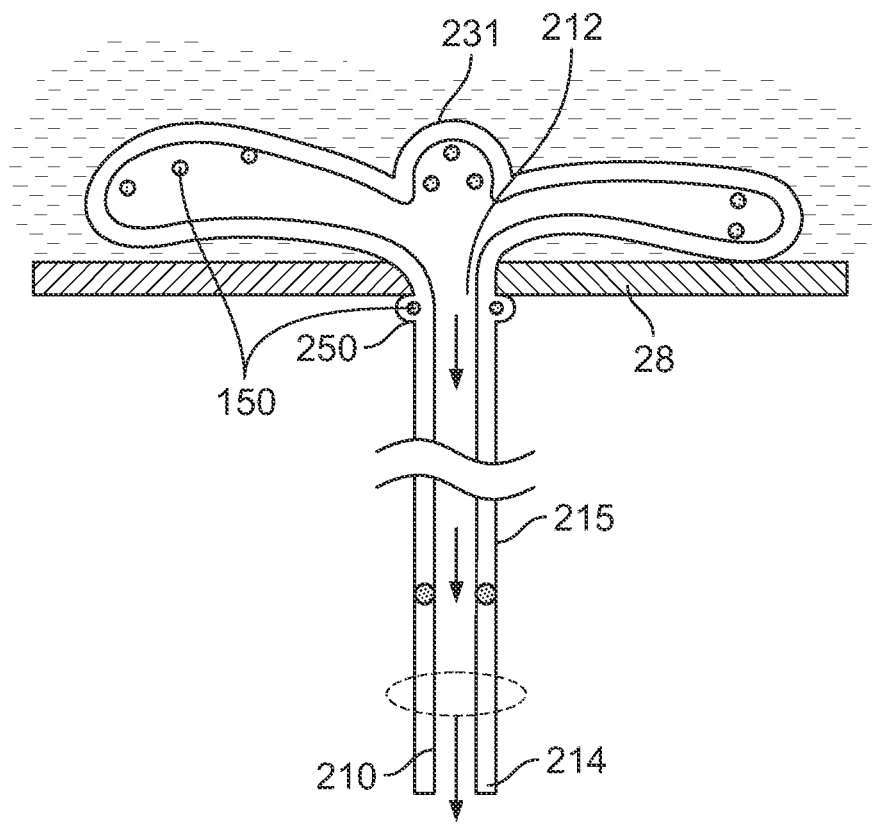
FIGS. 10A, 10B, and 10C illustrate cross-sectional views of a CSF shunt with a flow regulator, according to embodiments.
Figure 10B:
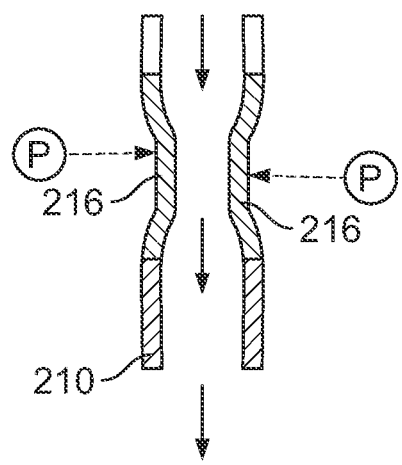
Figure 10C:
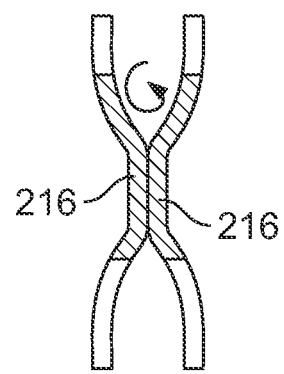

FIGS. 10A, 10B, and 10C illustrate another embodiment of a shunt 200 with a flow regulator (shown particularly in FIGS. 10B and 10C). The shunt 200 may be similar to the one illustrated in FIGS. 9A and 9B, but with the addition of a flow regulator. FIG. 10A shows a broken-line region along the transverse region 215 of the shunt body 210. FIGS. 10B and 10C generally correspond to the broken-line region in FIG. 10A. The transverse region 215 of the shunt body 210 include collapsible region(s) 216. The collapsible region(s) 216 may be located in a vein and/or in an interstitial space 18. The collapsible region(s) 216 may comprise a softer or more flexible material, which is more sensitive to exterior (outside the shunt 200) and interior (inside the shunt 200) pressures. Exemplary pressures are illustrated by the letters "P". When the pressure within the channel within the shunt 200 decreases and/or when the pressure from outside the shunt 200 increases, the collapsible region(s) 216 may partially collapse (FIG. 10B), such that the inner diameter of the shunt 200 in the collapsible region 216 has a minimum distance that is less than other portions of the channel (either in the collapsible region 216 or in other parts of the transverse region 215 of the shunt body 210). If the pressure is sufficient, the collapsible region 216 may completely collapse (FIG. 10C), such that a minimum inner diameter of the channel in the shunt 200 in the collapsible region 216 drops to approximately zero. As the inner diameter of the channel within the collapsible region 216 decreases, the amount of CSF 32 that can flow through the shunt 200 also may decrease. In such a way, the flow of CSF 32 flow may be regulated in response to changing pressures of the CSF fluid 32 and/or fluid in the vein and/or fluid in the interstitial space 18.

Figure 11A:
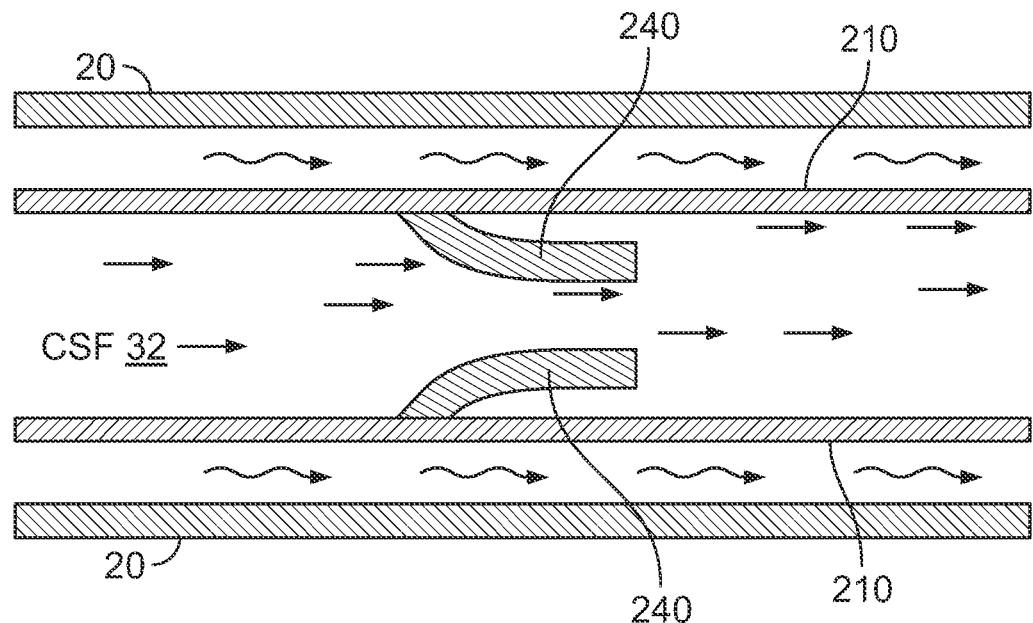
FIGS. 11A and 11B illustrate a cross-sectional view of a portion of a CSF shunt with an anti-reflux valve, according to embodiments.
Figure 11B:
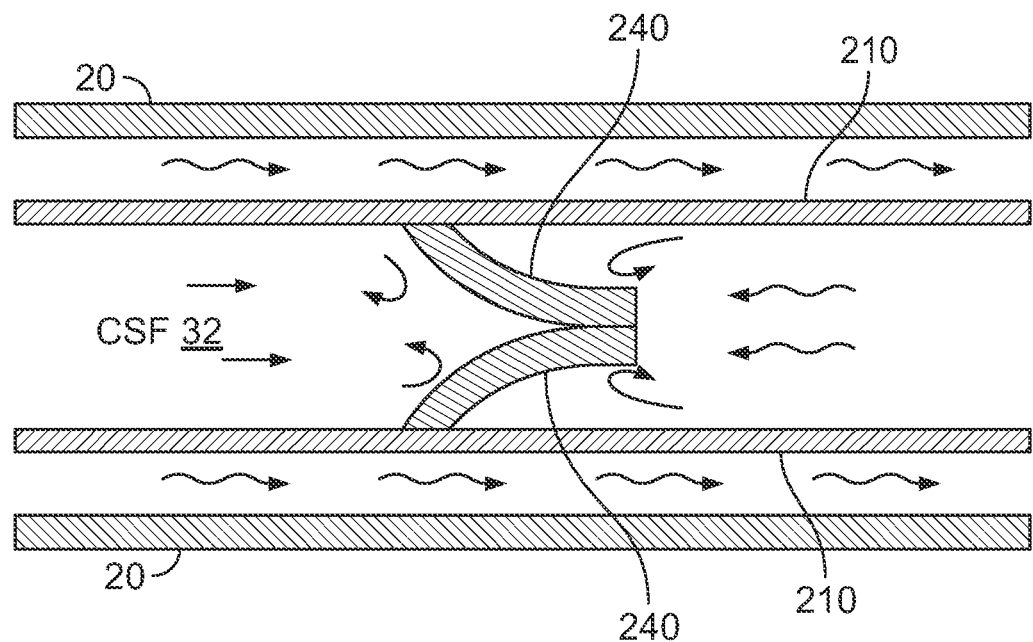

FIGS. 11A and 11B illustrate a cross-sectional view of a shunt 200 positioned in a venous pathway including an anti-reflux valve 240 located in the shunt body 210, according to embodiments. The anti-reflux valve 240 may be located in any suitable location along the channel between the inlet aperture 211 and the outlet aperture 213, or optionally at the apertures 211, 213 themselves. As seen in FIG. 11A, the shunt body 210 may be positioned in a venous pathway. CSF 32 may flow through the channel in the shunt body 210, through the valve 240 in an open position, and out of the outlet aperture 213 into the vein. Flow of CSF 32 is shown with straight lines with arrows. Blood may flow outside of the shunt body 210 within the vein. Flow of blood is shown with wavy lines with arrows. As seen in FIG. 11B, the valve 240 may move to a closed position, preventing or reducing retrograde flow of blood upstream through the channel in the shunt body 210 towards the intradural space 30. The valve 240 may close when the pressure of the CSF 32 flow is less than the pressure of the blood flow (e.g., if the CSF 32 flow pressure drops and/or the blood flow pressure increases).

The valve 240 may be programmable or non-programmable. A non-programmable valve 240 may be in an open position when the pressure in the intradural space 30 is above a certain level. This level may be determined by the valve 240 itself and may not be changed. A programmable valve 240 may allow the level to be adjusted by the surgeon. For example, the adjustment itself may be noninvasive, for example utilizing a magnet (e.g., handheld), and may be done in a clinic setting (e.g., outpatient). Furthermore, there may be anti-siphon device(s) or component(s) (not shown), that may prevent or reduce undue drainage of CSF 32 based on patients position in space. Anti-siphon components may be built into a valve 32 or be placed in series along the path of the shunt body 210 within the channel.

Figure 15:
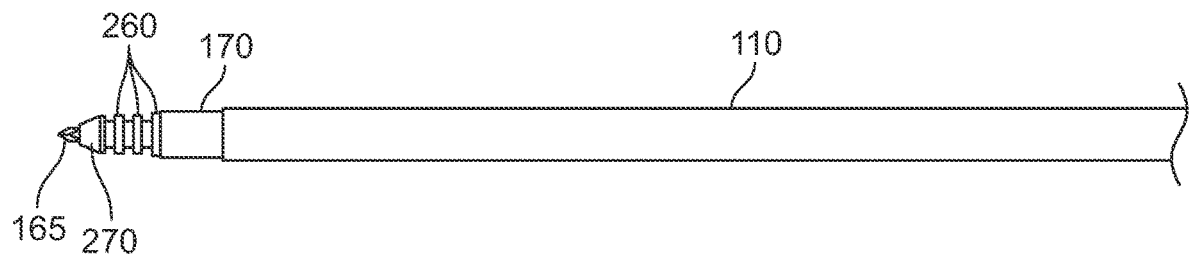
FIG. 15 shows a portion of a shunt delivery system and a shunt, according to embodiments.
Figure 16A:
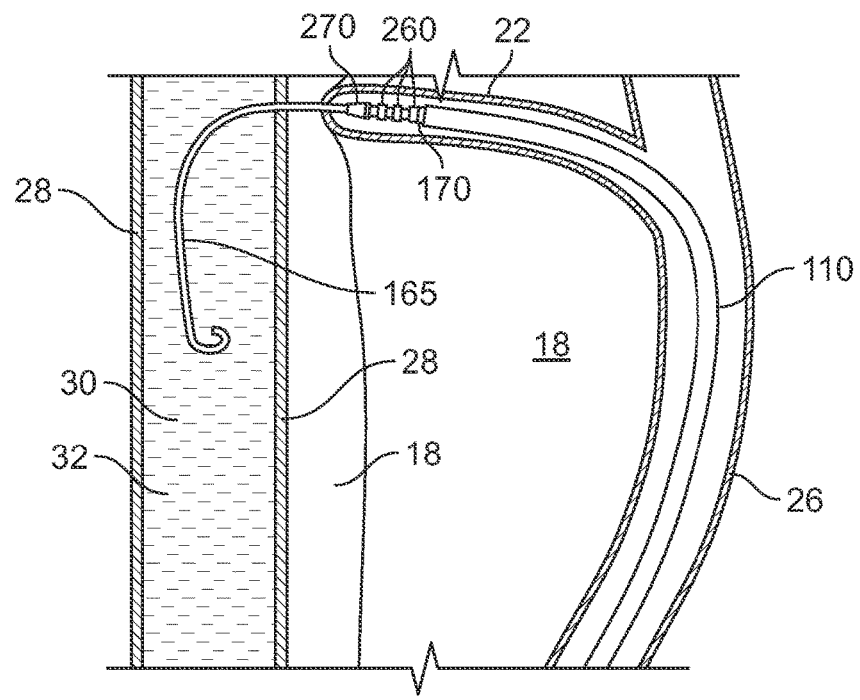
FIGS. 16A, 16B, and 16C show a sequence for implanting a shunt using a shunt delivery system, according to embodiments.
Figure 16B:
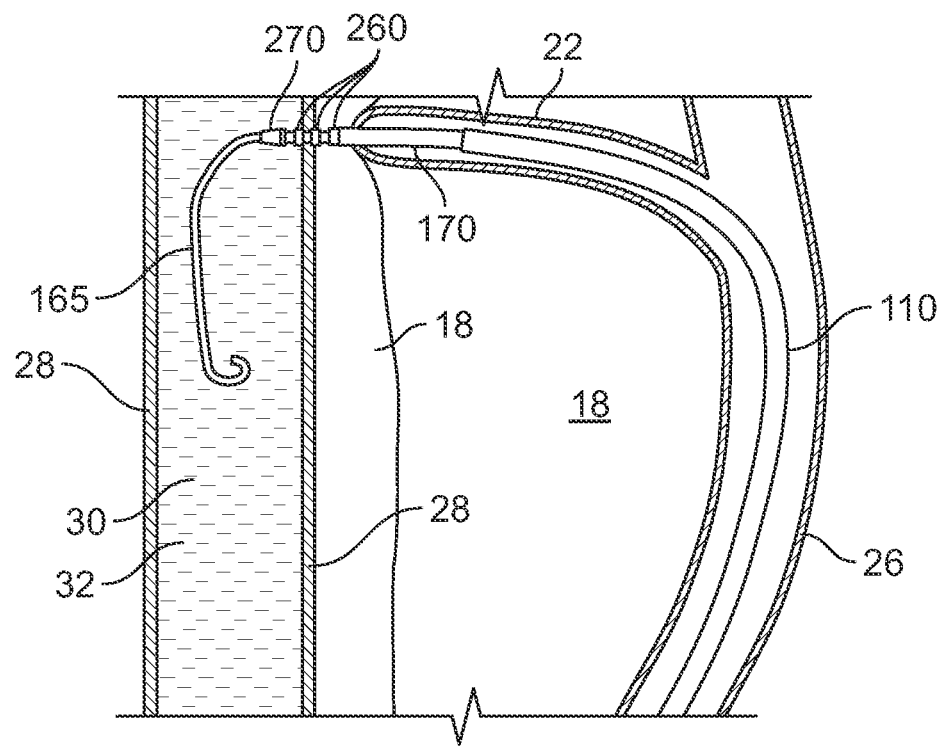
Figure 16C:
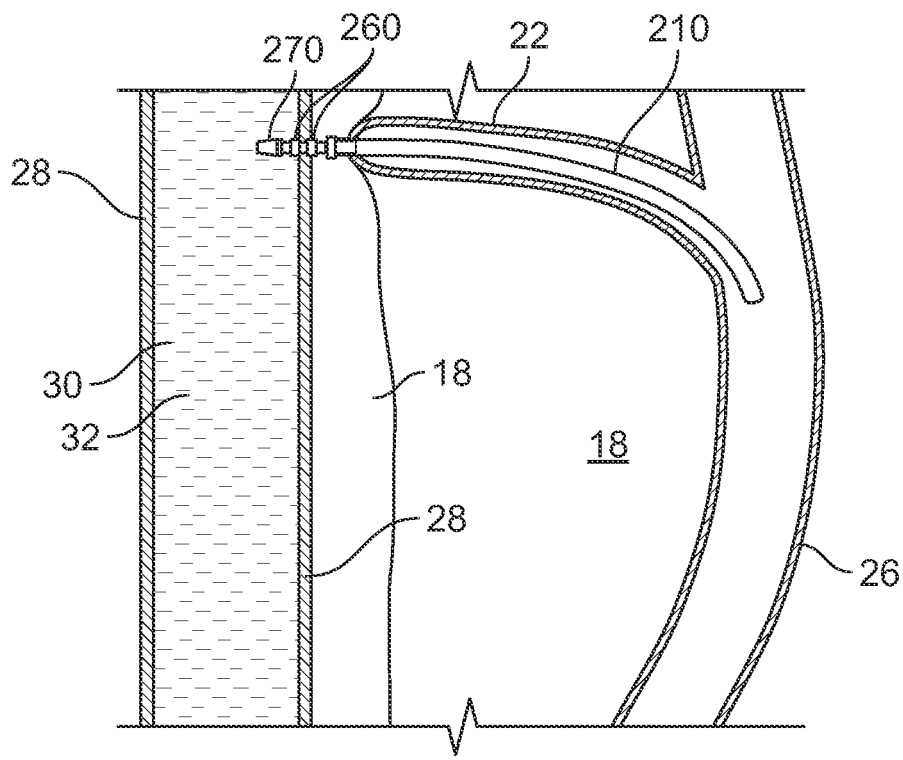

FIG. 15 illustrates embodiments of a shunt 200 and shunt delivery system 100. FIGS. 16A-16C illustrate embodiments for implanting the shunt 200 with the shunt delivery system 100 of FIG. 15. The shunt 200 and shunt delivery system 100 may be similar to other embodiments described herein. As shown in FIG. 15, the guide catheter 110 is loaded with the sheath 170. The sheath in turn covers at least a portion of the shunt body 210 (which is not visible in FIG. 15). Connected to the shunt body 210, there may be one or more radially-protruding portions 260 (three shown) and a bulbous head region 270. The bulbous head region 270 may be in an inlet region of the shunt 200. The bulbous head region 270 and radially-protruding portions 260 may be formed from one piece (e.g., machined from a single piece). This piece (or assembly of different pieces) may connect or couple to the shunt body 210 or another portion of the shunt 200 by standard bonding techniques. This piece may be similar to a spile, or a spile-like piece.

The shunt delivery system 100 may include an inner wire 160 (mostly occluded) having an inner wire tip 162. The inner wire 160 may pass through the shunt 200 and emerge through an aperture in the bulbous head region 270, which is the shunt inlet aperture 211. Alternatively, the inner wire 160 may stop before protruding from the bulbous head region 270, and the stylet 165 (not shown) may extend outwardly. A valley may be formed between the bulbous head region 270 and one of the radially-protruding portion(s) 260. Other valley(s) may be formed between the radially-protruding portion(s) 260. When the thecal sac 28 is punctured by the stylet 165 or inner wire 160, the bulbous head region 270 may be pushed through the aperture, such that the valley between the bulbous head region 270 and one of the radially-protruding portion(s) 260 is located transdurally across the distance of the aperture in the thecal sac 28. Alternatively, the shunt 200 may be pushed farther such that one of the other valley(s) is located transdurally. The one of the radially-protruding portion(s) 260 may act as exterior anchor (e.g., similar to exterior anchor 250) exterior to the thecal sac 28. The outer diameter of the shunt 200 at the valley(s) may be large enough such that the thecal sac 28 around the puncture exerts a force against a given valley located transdurally to provide anchoring support for the shunt 200.

The bulbous head region 270 may serve as an intradural anchor. According to an embodiment, the bulbous head region 270 is concave proximate the thecal sac 28.

In the sequence shown in FIGS. 16A-16C, the shunt 200 may be implanted as follows. The guide catheter 110 may be positioned via an endovenous procedure. The shunt 200 may be delivered through the venous system (e.g., to an intervertebral vein 22) via the shunt delivery system 100 through the guide catheter 110. Once at the vein wall, the stylet 165 may be advanced through the vein wall, the interstitial space 18, and the thecal sac 28. The bulbous head region 270 may be advanced through the apertures. Alternatively, the stylet 165 may puncture only the vein wall and then the bulbous head region 270 may be advanced through the aperture in the vein wall. Alternatively, once the stylet 165 has punctured the thecal sac 28, one or more regions in the puncture pathway (including the venous wall, the interstitial space 18, and the thecal sac 28) may be enlarged by an inflatable balloon (not shown). The balloon may be independent from the stylet 165 or may be part of the stylet 165. Once the bulbous head region 270 has been moved through some or all of the interstitial space 18, the stylet 165 may be advanced again to puncture the thecal sac 28. Then the bulbous head region 270 may be advanced through the aperture in the thecal sac 28 and into the intradural space 30. The bulbous head region 270 and/or the radially-protruding regions 260 may provide haptic feedback to the surgeon, such that the surgeon knows that the bulbous head region 270 and/or one or more of the radially-protruding region(s) 260 have passed through the thecal sac 28. The haptic feedback in combination with radiopaque markers 150 (which may be located on or in the bulbous head region 270, the radially-protruding region(s) 260, and/or valleys therebetween may facilitate the surgeon to implant the shunt 200 in a suitable location transdurally. The radially-protruding region(s) 260 may also limit the insertion depth of the shunt into the intradural space 30. Once the shunt 200 is suitably located, the shunt delivery system 100 (including the stylet 165 and the guide catheter 110) may be removed by the surgeon, leaving the shunt 200 in the suitable location.

Figure 12:
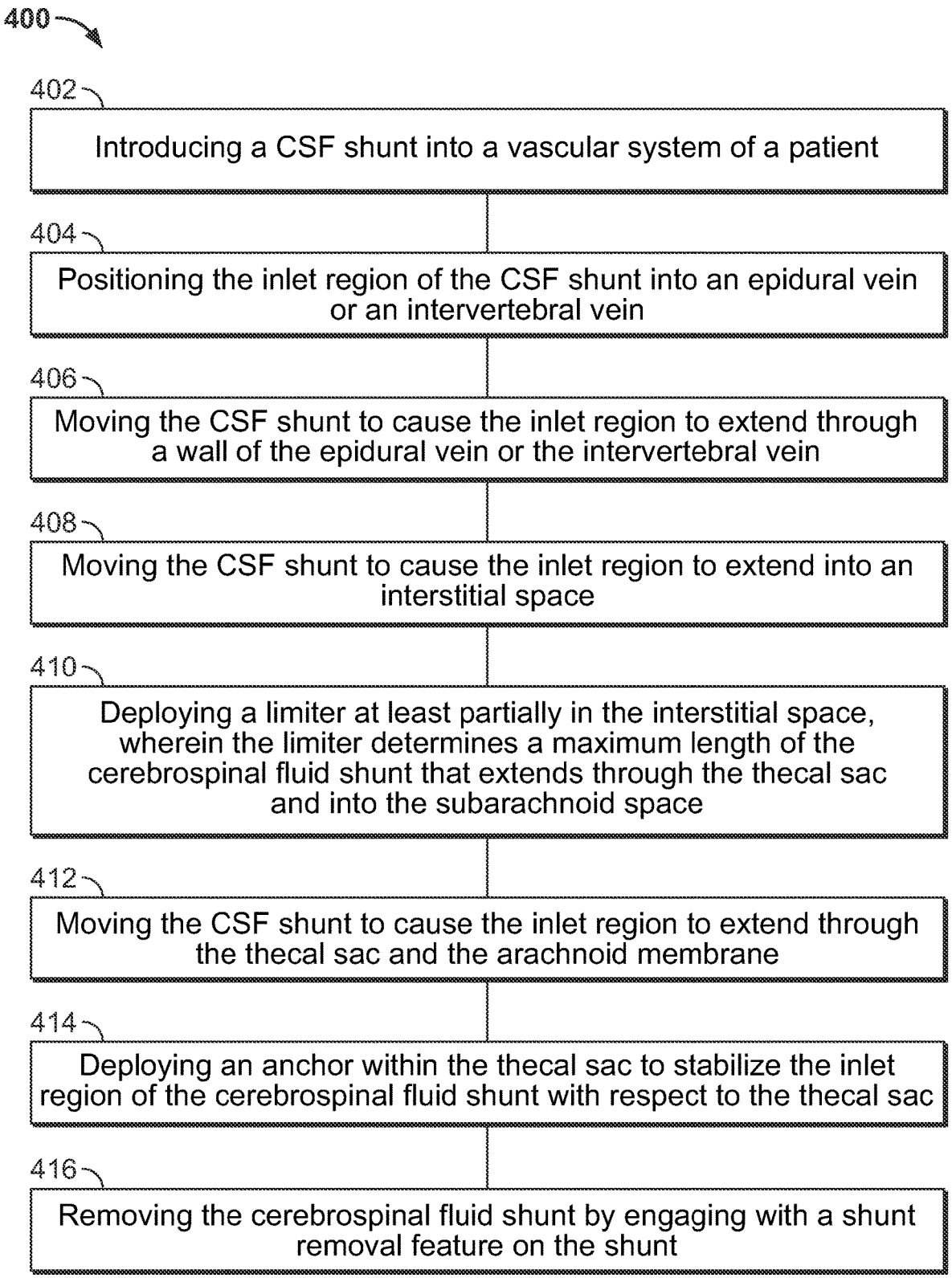
FIG. 12 shows a flow chart for a method of endovenously positioning a CSF shunt in a patient, according to embodiments.

FIG. 12 depicts a flow chart 400 for a method of endovenously implanting a shunt 200, according to embodiments. The method may be performed by a surgeon or a surgical robot. Some steps may be omitted. For example, the shunt 200 may not be removed from the patient. At step 402, a shunt 200 may be introduced into a vascular system of a patient, for example, into a vein of the leg, neck, or arm. At step 404, the inlet region 211 of the shunt 200 may be positioned in at least one of an epidural vein 20 or an intervertebral vein 22. These veins 20, 22 may be located in the lumbar region, the thoracic region, the cervical region, or the sacrum. At step 406, the shunt 200 may be moved to cause the inlet region 211 to extend through a wall of the epidural vein 20 or intervertebral vein 22. At step 408, the shunt 200 may be moved to cause the inlet region 211 to extend into an interstitial space 30. At step 410, a limiter 140 may be deployed at least partially in the interstitial space 18, wherein the limiter 140 may determine a maximum length that the shunt 200 can extend through the thecal sac 28 and into the intradural space 30. Deploying the limiter 140 may include expanding the limiter 140 such that an outer radius of the limiter 140 is greater than an outer radius of a transverse region 215 of the shunt 200 between the inlet region 212 and the outlet region 214. At step 412, the shunt 200 may be moved to cause the inlet region 212 to extend at least partially through the thecal sac 28 (including the arachnoid membrane). At step 414, an anchor 230 may be deployed within the intradural space 30 to stabilize the inlet region 212 of the shunt 200 with respect to the thecal sac 28. Once the shunt 200 is positioned in a final location, the outlet region 214 of the shunt 200 may be located in an epidural vein 18, an intervertebral vein 22, a perivertebral vein, or any suitable location along a venous pathway. The outlet region 214 may also be positioned in a vein wall, such that the outlet aperture 213 is in fluid communication with a venous pathway.

At step 416, the shunt 200 may be removed during a separate procedure at a later point in time, e.g., if the shunt 200 has failed, is failing, or is not needed any longer. The shunt 200 may be removed from the patient by engaging with a shunt removal feature on the shunt 200. To facilitate removal of the shunt 200, the outward radial force per the fingers 231 may be at or less than 90% of the tensile strength of the transverse stent body 215. This may allow the shunt 200 to be extracted via being withdrawn through the thecal sac 28 or into a catheter or sheath. As another embodiment, the tensile force required to cause the fingers 231 to collapse (or any other anchor 230 type to collapse) while being withdrawn into a catheter or sheath or from out from the thecal sac 28 may be at or less than 90% of the tensile strength of the transverse stent body 215. As another embodiment, a sheath may be pushed over the distal end of the shunt 200 to ensnare/cover and partially or fully collapse the anchor 230 and then be extracted.

In the donut-shaped anchor 230 embodiment, the radial outward radial force per the donut anchor 230 may be at or below 90% of the tensile strength of the transverse stent body 215, which may facilitate the shunt 200 to be extracted via being withdrawn through the thecal sac 28. As another embodiment, the tensile force may be at or less than 90% of that of the transverse shunt body 215 which is required to cause the donut anchor 230 to elongate and subsequently collapse while being withdrawn into a catheter or sheath or out from the thecal sac 28.

According to embodiments, the proximal shunt region, which resides in the vein, may contain a radiopaque marker 150 to allow for easy identification. The radiopaque marker 150 could be a material like platinum/iridium and/or may be combined with the shunt outlet 213. The shunt outlet region 214 may include a feature (e.g., a catch or a claps) to allow capture of the shunt 200 via a snare or a collapsible snare similar to a "Chinese finger trap." The radiopaque marker 150 may include a relatively soft material, like gold, to allow it be crushed and to possibly seal the shunt 200. The exterior shunt anchor 250, e.g., similar to the one shown in FIG. 9, may contain identification radiopaque marker 150 and might include a feature (e.g., a catch or clasp) to facilitate removal. A catheter that may include a snare or catch or clasp mechanism with a slideable sheath may be advanced over the shunt body 210 (after proximal end is snared) for extraction. The shunt transverse body 215 may include a feature such as a braided tube to stop or reduce elongation of the shunt 200 during removal or sealing. The shunt transverse body 215 may include reinforced plastic ribs in the tube wall, again to stop or reduce elongation. Such features may substantially maintain flexibility and non-kinking during extraction. The shunt transverse body 215 may be cut and removed from the distal shunt area and thus removed with the distal shunt area subsequently sealed.

In a different embodiment, the shunt inlet region 212 is similarly located in the intradural space 30 and the shunt body 210 is initially located within a venous pathway but finally traverses the venous wall such that the shunt outlet region 214 exits the body where it is connected to a valve 240, or is connected to a reservoir located under the skin. This embodiment may allow for the delivery of drugs directly into the CSF 32, allows for repeated chemical and biological analysis of the CSF 32, measurement of CSF 32 pressure, and at will CSF 32 evacuation.

According to an embodiment, the puncture site(s) at the thecal sac 28 and/or vein wall and/or interstitial space 18 may be dilated using a balloon (not shown) prior to implantation of the shunt 200. Before advancement of the shunt 200 through the shunt delivery system 100, a dilatation system may be advanced close to the implantation location through the guide catheter 110. The stylet 165 may extend through the dilatation system. The stylet 165 may puncture the thecal sac 28, vein wall, and/or interstitial space 18 either once the dilatation system has been positioned or before the dilatation system has been positioned. After the punctures have been made, a dilatation balloon in a deflated state may be advanced across the puncture site(s). The dilatation balloon may be advanced across multiple puncture sites at once or across selected puncture sites separately. The dilatation balloon may have one or more radiopaque markers 150 embedded or attached. Once the dilatation balloon is appropriately located at the puncture site(s), the surgeon may inflate the dilatation balloon to a suitable diameter to stretch the aperture(s) at the puncture site(s). After the tissue has been stretched, the dilatation balloon may be deflated, again at the control of the surgeon. The dilatation balloon and any other components of the dilatation system may be removed from the patient out through the guide catheter 110. Then the shunt 200 may be introduced over the stylet 165 and implantation of the shunt 200 may proceed as described herein.

In a related embodiment to the aforementioned one, the dilatation balloon may be part of the stylet 165. The dilatation balloon may have a length of or may inflatable on a length of 0.5 to 2 cm. The stylet 165 may perforate the venous wall then interstitial space 18 then thecal sac 28. Then the dilatation balloon on the stylet 165 may be inflated and subsequently deflated. Then the shunt 200 may be advanced over the style 165. Then the stylet 165 may be removed while the shunt 200 stays in place in the implantation location.

PARTS LIST

| Part | Reference |
| --- | --- |
| Spinal canal | 10 |
| Bone | 12 |
| Nerve | 14 |
| Nerve roots | 16 |
| Fat, interstitial space | 18 |
| Epidural vein | 20 |
| Intervertebral vein | 22 |
| Lumbar vein | 26 |
| Thecal sac | 28 |
| Intradural space | 30 |
| Cerebrospinal fluid | 32 |
| Shunt delivery system | 100 |
| Guide catheter | 110 |
| Guide wire | 120 |
| Stabilizer | 130 |
| Limiter | 140 |
| Radio-opaque markers | 150 |
| Inner wire | 160 |
| Inner wire shoulder | 161 |
| Inner wire tip | 162 |
| Stylet | 165 |
| Sheath | 170 |
| Spring | 180 |
| Shunt | 200 |
| Shunt body | 210 |
| Shunt inlet aperture | 211 |
| Shunt inlet region | 212 |
| Shunt outlet aperture | 213 |

-continued

| Part | Reference |
| --- | --- |
| Shunt outlet region | 214 |
| Shunt transverse region | 215 |
| Collapsible region | 216 |
| Strengthener | 220 |
| Anchor (intradural anchor) | 230 |
| Anchor fingers | 231 |
| Anchor wires | 232 |
| Valve (yellow in FIGS. 11) | 240 |
| Exterior (epidural) anchor | 250 |
| Radially protruding region | 260 |
| Bulbous head region | 270 |

It will be understood by those skilled in the art that various changes may be made and equivalents may be substituted without departing from the scope of the novel techniques disclosed in this application. In addition, many modifications may be made to adapt a particular situation or material to the teachings of the novel techniques without departing from its scope. Therefore, it is intended that the novel techniques not be limited to the particular techniques disclosed, but that they will include all techniques falling within the scope of the appended claims.

The invention claimed is:

1. A method for endovenously positioning a cerebrospinal fluid shunt in a patient, the method comprising:
introducing the cerebrospinal fluid shunt into a vascular system of the patient, wherein the cerebrospinal fluid shunt includes an inlet aperture in an inlet region and an outlet aperture in an outlet region, wherein the inlet aperture and the outlet aperture are in fluid communication with each other;
positioning the inlet region of the cerebrospinal fluid shunt into an epidural vein or an intervertebral vein;
with a stylet, puncturing a wall of the epidural vein or the intervertebral vein, traversing an interstitial space, and puncturing a thecal sac;
moving the cerebrospinal fluid shunt to cause the inlet region to extend through a wall of the epidural vein or the intervertebral vein;
subsequent to moving the cerebrospinal fluid shunt to cause the inlet region to extend through a wall of the epidural vein or the intervertebral vein, moving the cerebrospinal fluid shunt to cause the inlet region to extend into an interstitial space; and
subsequent to moving the cerebrospinal fluid shunt to cause the inlet region to extend into the interstitial space, moving the cerebrospinal fluid shunt to cause the inlet region to extend through the thecal sac, such that the inlet region of the cerebrospinal fluid shunt is positioned in an intradural space, and such that the outlet region of the cerebrospinal fluid shunt is positioned in a venous pathway.

2. The method of claim 1, wherein the epidural vein or the intervertebral vein is located in a lumbar region of the patient.

3. The method of claim 1, wherein the epidural vein or the intervertebral vein is located in a thoracic region of the patient.

4. The method of claim 1, wherein the epidural vein or the intervertebral vein is located in a cervical region of the patient.

5. The method of claim 1, wherein the epidural vein or the intervertebral vein is located in a sacrum of the patient.

6. The method of claim 1, wherein the venous pathway where the outlet aperture of the cerebrospinal fluid shunt is located includes at least one of an epidural vein, an intervertebral vein, a paraspinal vein, a lumbar vein, an iliac vein, a femoral vein, an azygos vein, a hemiazygos vein, an inferior vena cava, a superior vena cava, a right atrium of a heart, or a vein tributary of the inferior vena cava or superior vena cava.

7. The method of claim 1, further comprising, subsequent to puncturing the thecal sac, deploying an anchor within the intradural space to stabilize the inlet region of the cerebrospinal fluid shunt with respect to the thecal sac.

8. The method of claim 1, further comprising, prior to puncturing the thecal sac, deploying a limiter at least partially in the interstitial space, wherein the limiter determines a maximum length of the cerebrospinal fluid shunt that extends through the thecal sac and into the intradural space.

9. The method of claim 8, wherein said deploying a limiter comprises expanding the limiter such that an outer radius of the limiter is greater than an outer radius of a transverse region of the cerebrospinal fluid shunt between the inlet region and the outlet region.

10. The method of claim 1, wherein the outlet region of the cerebrospinal fluid shunt is located in one of an epidural vein, an intervertebral vein, a lumbar vein, an iliac vein, a perivertebral vein, a femoral vein, an azygos vein, a hemiazygos vein, or a vena cava when the inlet region of the cerebrospinal fluid shunt is located in the intradural space.

11. The method of claim 1, wherein the cerebrospinal fluid shunt comprises silicone.

12. The method of claim 1, wherein the cerebrospinal fluid shunt comprises polyurethane.

13. The method of claim 1, wherein the cerebrospinal fluid shunt comprises nitinol.

14. The method of claim 1, wherein the cerebrospinal fluid shunt comprises at least one radiopaque marker.

15. The method of claim 1, wherein the cerebrospinal fluid shunt comprises a material on at least one of an exterior of the cerebrospinal fluid shunt or an interior of the inlet region configured to reduce at least one of coagulation of blood, aggregation of proteins, or aggregation of cells.

16. The method of claim 1, wherein the cerebrospinal fluid shunt comprises an anti-reflux mechanism between the inlet aperture and the outlet aperture, wherein the anti-reflux mechanism is configured to reduce or prevent retrograde migration of blood.

17. The method of claim 1, wherein the cerebrospinal fluid shunt comprises a flow regulator between the inlet aperture and the outlet aperture, wherein the flow regulator is configured to regulate a flow of cerebrospinal fluid between the inlet aperture and the outlet aperture.

18. The method of claim 1, wherein said introducing the cerebrospinal fluid shunt into the vascular system of the patient comprises introducing the cerebrospinal fluid shunt into a vein of a leg, a vein of a neck, or a vein of an arm.

19. The method of claim 1, further comprising removing the cerebrospinal fluid shunt by engaging with a shunt removal feature on the cerebrospinal fluid shunt.

20. The method of claim 1, further comprising, temporarily enlarging at least one enlargement location, at least one of the aperture through one of the epidural vein wall or the intervertebral vein wall, a region of interstitial space, or the aperture through the thecal sac by positioning a balloon at the at least one enlargement location and then inflating the balloon to perform enlarging before or during passage of the shunt through the at least one enlargement location.

21. The method of claim 1, wherein the cerebrospinal fluid shunt further comprises
a transverse region between the inlet region and the outlet region, wherein the transverse region comprises a channel to enable fluid communication between the inlet aperture and the outlet aperture; and
an insertion-limiting portion at the transverse region, wherein the insertion-limiting portion is configured to be positioned in the interstitial space or a vein.

22. The method of claim 21, wherein the cerebrospinal fluid shunt further comprises:
at least one radio opaque marker at least partially located in the inlet region;
at least one radio opaque marker located at least partially in the transverse region; and
at least one radio opaque marker located at least partially in the outlet region.

23. The method of claim 22, wherein the inlet region comprises a bulbous head region.

24. The method of claim 23, wherein the insertion-limiting portion comprises a radially-protruding portion, and wherein the bulbous head region and the radially-protruding portion are integrated in one piece.

25. The method of claim 24, wherein the one piece is coupled to another portion of the cerebrospinal fluid shunt including the outlet region.

26. The method of claim 1, further comprising:
positioning a sheath through the thecal sac; and
causing the cerebrospinal fluid shunt to emerge from a distal end of the sheath.

27. The method of claim 26, further comprising removing the sheath and exposing the entirety of the cerebrospinal fluid shunt.

28. The method of claim 26, wherein the sheath further comprises a limiter, and wherein positioning the sheath comprises locating the limiter in the interstitial space or in a vein prior to causing the cerebrospinal fluid shunt to emerge from the distal end of the sheath.

29. The method of claim 1, wherein the cerebrospinal fluid shunt includes at least one radial valley, and further comprising locating one of the at least one valley transdurally when the cerebrospinal fluid shunt is completely deployed.

30. The method of claim 29, wherein the at least one valley comprises a plurality of valleys.

31. A method for endovenously positioning a cerebrospinal fluid shunt in a patient, the method comprising:
introducing the cerebrospinal fluid shunt into a vascular system of the patient, wherein the cerebrospinal fluid shunt includes an inlet aperture in an inlet region and an outlet aperture in an outlet region, wherein the inlet aperture and the outlet aperture are in fluid communication with each other;
positioning the inlet region of the cerebrospinal fluid shunt into an epidural vein or an intervertebral vein;
subsequent to positioning the inlet region of the cerebrospinal fluid shunt the epidural vein or the intervertebral vein, moving the cerebrospinal fluid shunt to cause the inlet region to extend into an interstitial space; and
subsequent to moving the cerebrospinal fluid shunt to cause the inlet region to extend into an interstitial space, moving the cerebrospinal fluid shunt to cause the inlet region to pass through an aperture in a thecal sac, such that the inlet region of the cerebrospinal fluid shunt is positioned at least partially in an intradural space, and such that the outlet region of the cerebrospinal fluid shunt is positioned in a venous pathway.

32. A method for endovenously positioning a cerebrospinal fluid shunt in a patient, the method comprising:
  introducing the cerebrospinal fluid shunt into a vascular system of the patient, wherein the cerebrospinal fluid shunt includes an inlet aperture in an inlet region and an outlet aperture in an outlet region, wherein the inlet aperture and the outlet aperture are in fluid communication with each other;
  positioning the inlet region of the cerebrospinal fluid shunt into an epidural vein or an intervertebral vein;
  moving the cerebrospinal fluid shunt to cause the inlet region to pass through an aperture in a wall of the epidural vein or the intervertebral vein; and
  subsequent to moving the cerebrospinal fluid shunt to cause the inlet region to pass through a wall of the epidural vein or the intervertebral vein, moving the cerebrospinal fluid shunt to cause the inlet region to pass through an aperture in a thecal sac, such that the inlet region of the cerebrospinal fluid shunt is positioned at least partially within an intradural space, and such that the outlet region of the cerebrospinal fluid shunt is positioned in a venous pathway.

33. A method for endovenously positioning a cerebrospinal fluid shunt in a patient, the method comprising:
  introducing the cerebrospinal fluid shunt into a vascular system of the patient, wherein the cerebrospinal fluid shunt includes an inlet aperture in an inlet region and an outlet aperture in an outlet region, wherein the inlet aperture and the outlet aperture are in fluid communication with each other;
  positioning the inlet region of the cerebrospinal fluid shunt into an epidural vein or an intervertebral vein;
  moving the cerebrospinal fluid shunt to cause the inlet region to extend through a wall of the epidural vein or the intervertebral vein;
  subsequent to moving the cerebrospinal fluid shunt to cause the inlet region to extend through a wall of the epidural vein or the intervertebral vein, moving the cerebrospinal fluid shunt to cause the inlet region to extend into an interstitial space; and
  subsequent to moving the cerebrospinal fluid shunt to cause the inlet region to extend into the interstitial space, moving the cerebrospinal fluid shunt to cause the inlet region to extend through a thecal sac, such that the inlet region of the cerebrospinal fluid shunt is positioned in an intradural space, and such that the outlet region of the cerebrospinal fluid shunt is in fluid communication with at least one of a reservoir positioned at under a skin of the patient or a transdermal port.

34. The method of claim 33, wherein the transdermal port is configured to at least one of permit delivery of a drug to the patient, drain CSF, or facilitate measurement of CSF pressure.

* * * * *